(12) United States Patent
Youn et al.

(10) Patent No.: US 11,470,657 B2
(45) Date of Patent: Oct. 11, 2022

(54) METHOD, USER EQUIPMENT, AND NETWORK NODE FOR PERFORMING PDU SESSION ESTABLISHMENT PROCEDURE FOR LADN

(71) Applicant: LG Electronics Inc., Seoul (KR)

(72) Inventors: Myungjune Youn, Seoul (KR); Hyunsook Kim, Seoul (KR); Jinsook Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 17/040,440

(22) PCT Filed: Mar. 26, 2019

(86) PCT No.: PCT/KR2019/003502
§ 371 (c)(1),
(2) Date: Sep. 22, 2020

(87) PCT Pub. No.: WO2019/190166
PCT Pub. Date: Oct. 3, 2019

(65) Prior Publication Data
US 2021/0120596 A1 Apr. 22, 2021

(30) Foreign Application Priority Data
Mar. 29, 2018 (KR) .......... 10-2018-0036720

(51) Int. Cl.
*H04W 76/10* (2018.01)
*H04W 84/12* (2009.01)
*H04W 8/08* (2009.01)

(52) U.S. Cl.
CPC ............. *H04W 76/10* (2018.02); *H04W 8/08* (2013.01); *H04W 84/12* (2013.01)

(58) Field of Classification Search
CPC ....... H04W 48/18; H04W 60/00; H04W 8/08; H04W 76/11; H04W 76/10; H04W 48/16;
(Continued)

(56) References Cited

U.S. PATENT DOCUMENTS

| 2018/0279397 A1* | 9/2018 | Faccin | H04W 76/15 |
| 2019/0053104 A1* | 2/2019 | Qiao | H04L 47/20 |

(Continued)

FOREIGN PATENT DOCUMENTS

WO  WO2018038490  3/2018

OTHER PUBLICATIONS

3rd Generation Partnership Project; Technical Specification Group Services and System Aspects, 2. "System Architecture for the 5G System; Stage 2 (Release 15)," 3GPP TS 23.501 V15.1.0, Mar. 2018, 201 pages.

(Continued)

*Primary Examiner* — Daniel Lai
(74) *Attorney, Agent, or Firm* — Fish & Richardson P.C.

(57) ABSTRACT

One disclosure of the present specification provides a method by which a user equipment (UE) performs a protocol data unit (PDU) session establishment procedure for a local area data network (LADN). The method comprises: when a pre-set condition related to an LADN policy is satisfied, transmitting a message requesting an access and mobility management function (AMF) for the LADN policy; receiving, from the AMF, the LADN policy provided by a policy control function (PCF), wherein the LADN policy comprises information about at least one application and information about a LADN data network name (DNN) related to the at least one application; determining a LADN DNN to be used by the UE, on the basis of the LADN policy; and transmitting a PDU session establishment request message related to the determined LADN DNN to the AMF.

14 Claims, 24 Drawing Sheets

(58) Field of Classification Search
CPC ....... H04W 80/10; H04W 8/02; H04W 60/04;
H04W 24/02; H04W 8/18; H04W 4/50;
H04W 48/20; H04W 84/12; H04W 24/04;
H04W 36/08; H04W 8/06; H04W 4/029;
H04W 64/00; H04W 76/12; H04W 28/02
See application file for complete search history.

(56) References Cited

U.S. PATENT DOCUMENTS

| | | | |
|---|---|---|---|
| 2019/0182788 A1* | 6/2019 | Lee | H04W 68/02 |
| 2020/0120751 A1* | 4/2020 | Sugawara | H04W 80/10 |
| 2020/0252856 A1* | 8/2020 | Zhu | H04W 8/26 |

OTHER PUBLICATIONS

3rd Generation Partnership Project; Technical Specification Group Services and System Aspects, 3. "Policy and Charging Control Framework for the 5G System; Stage 2 (Release 15)," 3GPP TS 23.503 V15.1.0, Mar. 2018, 65 pages.

3rd Generation Partnership Project; Technical Specification Group Core Network and Terminals, 4. "Non-Access-Stratum (NAS) protocol for 5G System (5GS); Stage 3 (Release 15)," 3GPP TS 24.501 V1.0.0, Mar. 2018, 253 pages.

Samsung, "TS 23.502—PCF initiated UE Policy Update Procedure," S2-171943, SA WG2 Temporary Document, SA WG2 Meeting #S2-120, Mar. 27-31, 2017, Busan, South Korea, 2 pages.

* cited by examiner

METHOD, USER EQUIPMENT, AND NETWORK NODE FOR PERFORMING PDU SESSION ESTABLISHMENT PROCEDURE FOR LADN

CROSS-REFERENCE TO RELATED APPLICATIONS

This application is a National Stage application under 35 U.S.C. § 371 of International Application No. PCT/KR2019/003502, filed on Mar. 26, 2019, which claims the benefit of Korean Patent Application No. 10-2018-0036720, filed on Mar. 29, 2018. The disclosures of the prior applications are incorporated by reference in their entirety.

BACKGROUND OF THE DISCLOSURE

Field of the Disclosure

The present disclosure relates to next generation mobile communication.

Related Art

In 3GPP, in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year of 2004.

The SAE, which has been performed based on 3GPP SA WG2, is a research regarding network technology that aims to determine the structure of a network and to support mobility between heterogeneous networks in line with an LTE task of a 3GPP TSG RAN and is one of the most recent important standardization issues of 3GPP. The SAE is a task for developing the 3GPP system into a system that supports various radio access technologies based on an IP, and the task has been carried out for the purpose of an optimized packet-based system, which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows an exemplary architecture of an evolved mobile communication network.

An Evolved Packet Core (EPC) may include various elements. FIG. 1 illustrates a Serving Gateway (S-GW) (52), a Packet Data Network Gateway (PDN GW) (53), a Mobility Management Entity (MME) (51), a Serving General Packet Radio Service (GPRS) Supporting Node (SGSN), and an enhanced Packet Data Gateway (ePDG) that correspond to some of the various elements.

The S-GW (52) is an element that operates at a boundary point between a Radio Access Network (RAN) and a core network and has a function of maintaining a data path between an eNodeB (22) and the PDN GW (53). Furthermore, if a user equipment (UE) moves in a region in which service is provided by the eNodeB (22), the S-GW (52) plays a role of a local mobility anchor point. That is, for mobility within an E-UTRAN (i.e., a Universal Mobile Telecommunications System (Evolved-UMTS) Terrestrial Radio Access Network defined after 3GPP Release-8), packets can be routed through the S-GW (52). Furthermore, the S-GW (52) may play a role of an anchor point for mobility with another 3GPP network (i.e., a RAN defined prior to 3GPP Release-8, e.g., a UTRAN or Global System for Mobile communication (GSM) (GERAN)/Enhanced Data rates for Global Evolution (EDGE) Radio Access Network).

The PDN GW (or P-GW) (53) corresponds to the termination point of a data interface toward a packet data network. The PDN GW (53) can support policy enforcement features, packet filtering, charging support, and so on. Furthermore, the PDN GW (or P-GW) (53) can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW (52) and the PDN GW (53) have been illustrated as being separate gateways, but the two gateways may be implemented in accordance with a single gateway configuration option.

The MME (51) is an element for performing the access of a terminal to a network connection and signaling and control functions for supporting the allocation, tracking, paging, roaming, handover, and so on, of network resources. The MME (51) controls control plane functions related to subscribers and session management. The MME (51) manages numerous eNodeBs (22) and performs conventional signaling for selecting a gateway for handover to another 2G/3G networks. Furthermore, the MME (51) performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U, S1-MME, and so on). In a 3GPP system, a conceptual link that connects two functions being present in the different function entities of an E-UTRAN and an EPC is defined as a reference point. Table 1 below describes the reference points shown in FIG. 1. In addition to the reference points shown in the example of Table 1, various reference points may be present depending on the network configuration.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |

TABLE 1-continued

| Reference point | Description |
|---|---|
| S3 | It enables user and bearer information exchange for inter 3GPP access network mobility in Idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

<Next Generation Mobile Communication Network>
Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps in any location.

The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 3 may perform all or a part of the MME (Mobility Management Entity) function of the fourth generation mobile communication, and all or a part of the control plane function of the Serving Gateway (S-GW) and the PDN-gateway (P-GW) of the fourth generation mobile communication.

The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

FIG. 3a is an exemplary diagram illustrating an architecture for supporting a multiple PDU session through two data networks. FIG. 3b is an exemplary diagram illustrating an architecture for supporting a concurrent access through two data networks.

FIG. 3a illustrates an architecture that allows a UE to simultaneously access two data networks using a multiple PDU session. Two SMFs may be selected for two different PDU sessions.

FIG. 3b illustrates an architecture that allows the UE to simultaneously access two data networks using one PDU session.

Additionally, FIG. 3a and FIG. 3b show various reference points (e.g., N1, N2, N3, and so on). In the 3GPP system, a conceptual link that connects two functions existing in different functional entities of a Next Generation-Radio Access Network (NG-RAN) and a 5G Core (5GC) network is defined as a reference point. Table 2 shown below describes the reference points shown in FIG. 3a and FIG. 3b. Apart from the examples shown in Table 2, other various reference points may exist depending upon the network structure.

TABLE 2

| Reference point | Description |
| --- | --- |
| N1 | Reference point between UE and AMF |
| N2 | Reference point between (R)AN and AMF |
| N3 | Reference point between (R)AN and UPF |
| N4 | Reference point between SMF and UPF |
| N5 | Reference point between PCF and AF |
| N6 | Reference point between UPF and Data Network (DN) |
| N7 | Reference point between SMF and PCF |
| N8 | Reference point between UDM and AMF |
| N10 | Reference point between UDM and SMF |
| N11 | Reference point between AMF and SMF |
| N12 | Reference point between AMF and AUSF |
| N13 | Reference point between UDM and AUSF |
| N15 | In a non-roaming scenario, reference point between PCF and AMF<br>In a roaming scenario, reference point between AMF and PCF of a visited network |
| N22 | Reference point between AMF and NSSF |
| N24 | Reference point between visted PCF(vPCF) and home PCF(hPCF) |

For reference, in Table 2, N5, N7, N8, N10, N11, N12, N13, N15, N22 and N24 show interaction existing between Network Functions (NFs). These reference points are implemented by corresponding NF service-based interfaces. And, these reference points are implemented by specifying consumer and producer NF services in order to implement specific system procedures. <Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in relation with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

<Roaming in Next Generation Mobile Communication Network>

Meanwhile, there are two schemes of processing a signaling request from the UE in a situation in which the UE roams to a visited network, e.g., a Visited Public Land Mobile Network (VPLMN). In a local break out (LBO) scheme which is a first scheme, the signaling request from the UE is processed in the visited network. According to a home routing (HR) scheme which is a second scheme, the visited network delivers the signaling request from the UE to a home network.

FIG. 4a is an exemplary diagram illustrating an architecture to which a local breakout (LBO) scheme is applied during roaming and FIG. 4b is an exemplary diagram illustrating an architecture to which a home routed (HR) scheme is applied during roaming.

As illustrated in FIG. 4a, in an architecture to which the LBO scheme is applied, data of a user is delivered to a data network in the VPLMN. To this end, the PCF in the VPLMN performs an interaction with the AF in order to generate a PCC rule for a service in the VPLMN. A CPF node in the VPLMN generates the PCC rule based on a policy set internally according to a roaming agreement with a Home Public Land Mobile Network (HPLMN) operator.

As illustrated in FIG. 4b, in an architecture to which the HR scheme is applied, data of the UE is delivered to the data network in the HPLMN.

<Data Detouring to Non-3GPP Network>

In the next generation mobile communication, the data of the UE may be detoured to a non-3 GPP network, e.g., a Wireless Local Area Network (WLAN) or WiFi™.

FIGS. 5a to 5f illustrate architectures for detouring data to a non-3GPP network.

The Wireless Local Area Network (WLAN) or Wi-Fi™ is considered as an untrusted non-GPP network. In order to connect the non-3GPP network to a core network, Non-3GPP InterWorking Function (N3IWF) may be added.

When establishing a PDU session related to an application, the UE may use a local area data network (LADN). The LADN is a data network (DN) that may be accessed by the UE only at a specific location. The access from the LADN to the DN through the PDU session is possible only in a service area of the LADN.

In order for the UE to perform communication by using the LADN, the network should have subscription information related to a LADN Data Network Name (DNN) of the corresponding LADN. In the case of the UE which is roaming, since the LADN DNN is a DNN used only in a LADN service area, a home operator does not know LADN DNN information for a serving network to which the UE is roaming. As a result, there is a problem in that the UE which is roaming may not receive the service using the LADN.

In order to solve the problem, a scheme is introduced, which allows the home operator to use the LADN DNN even during roaming by using a wildcard DNN concept. However, when the UE determines whether establishing the PDU session is required based on a URSP rule when establishing the PDU session, only the home operator may provide the URSP rule to the UE. Since the home operator does not know the URSP rule for the LADN DNN being provided in a roaming network at which the UE is located, the home operator may not provide, to the UE, the URSP rule related to the LADN DNN, the UE cannot perform a procedure of establishing the PDU session to the LADN DNN. As a result, there is a problem in that the UE which is roaming may not receive the service using the LADN in spite of using the wildcard DNN.

SUMMARY OF THE DISCLOSURE

Accordingly, disclosures of this specification are to solve the problems.

In order to achieve the object, provided is a method for performing a Protocol Data Unit (PDU) session establishment procedure for LADN by a user equipment (UE). The method may include: when a preconfigured condition related to a Local Area Data Network (LADN) policy is satisfied, transmitting a message for requesting an LADN policy to an Access and Mobility Management Function (AMF); receiving, from the AMF, the LADN policy provided by a Policy Control Function (PCF), in which the LADN policy includes information related to at least one application and information related to a LADN Data Network Name (DNN) related to the at least one application; determining a LADN DNN to be used by the UE based on the LADN policy; and transmitting, to the AMF, a PDU session establishment request message related to the determined LADN DNN.

The message for requesting the LADN policy may include at least one of information indicating that the LADN policy is requested, information associated with the LADN DNN, information related to a registration area of the UE, and information related to a location of the UE.

The information related to the LADN DNN included in the LADN policy may include information related to at least one of Single Network Slice Selection Assistance Information (S-NSSAI) associated with the LADN DNN, a Session and Service Continuity (SSC) mode, and a PDU session type.

The preconfigured condition may be satisfied when the information associated with the LADN is received from the AMF or the UE enters an LADN service area.

The message for requesting the LADN policy may include information related to the LADN policy previously received from the AMF and the method may further include receiving, from the AMF, the LADN policy updated by the PCF.

The information related to the at least one application may be an application ID or packet filter type information.

In order to achieve the object, provided is a method for performing a Protocol Data Unit (PDU) session establishment procedure for LADN by a Policy Control Function (PCF). The method may include: receiving, from an Access and Mobility Management Function (AMF), a message for requesting a Local Area Data Network policy (LADN policy), in which the message for requesting the LADN policy is a message transmitted to the AMF by a user equipment (UE); generating the LADN policy based on the message for requesting the LADN policy, in which the LADN policy includes information related to at least one application and information related to a LADN DNN related to the at least one application; and transmitting, to the AMF, the LADN policy.

The LADN policy may be delivered from the AMF to the UE and used for determining the LADN DNN to be used by the UE.

The method may further include: receiving, from the AMF, information for notifying that information related to the LADN is provided to the UE; and when the AMF receives the information for notifying that the information related to the LADN is provided, transmitting the LADN policy to the AMF.

The method may further include: transmitting, to the AMF, a message for configuring an event related to the LADN; and when the message for configuring the event related to the LADN is received from the AMF, transmitting the LADN policy to the AMF, in which the event related to the LADN may include an event in which the UE enters an LADN service area.

The message for requesting the LADN policy may include at least one of information indicating that the LADN policy is requested, information associated with the LADN DNN, information related to a registration area of the UE, information related to a location of the UE, operating system (OS) information of the UE, and PSI information.

The method may further include: when the message for requesting the LADN policy includes information related to the LADN policy previously received by the UE, generating an updated LADN policy; and transmitting the updated LADN policy to the AMF.

The information related to the at least one application may be an application ID or packet filter type information.

In order to achieve the object, a disclosure of this specification proposes a processor of a wireless device. The processor may control the wireless device, and the processor may be configured to when a preconfigured condition related to a Local Area Data Network (LADN) policy is satisfied, transmit a message for requesting an LADN policy to an Access and Mobility Management Function (AMF); receive, from the AMF, the LADN policy provided by a Policy Control Function (PCF), in which the LADN policy includes information related to at least one application and information related to a LADN DNN related to the at least one application; determine the LADN DNN to be used based on the LADN policy; and transmit, to the AMF, a Protocol Data Unit (PDU) session establishment request message related to the determined LADN DNN.

According to a disclosure of this specification, the existing problem is solved.

BRIEF DESCRIPTION OF THE DRAWINGS

FIG. 6b is a signal flow chart showing an exemplary registration procedure continuing from FIG. 6a.

FIG. 7b is a signal flow chart showing an exemplary PDU Session Establishment procedure continuing from FIG. 7a.

DESCRIPTION OF EXEMPLARY EMBODIMENTS

Figure 1:
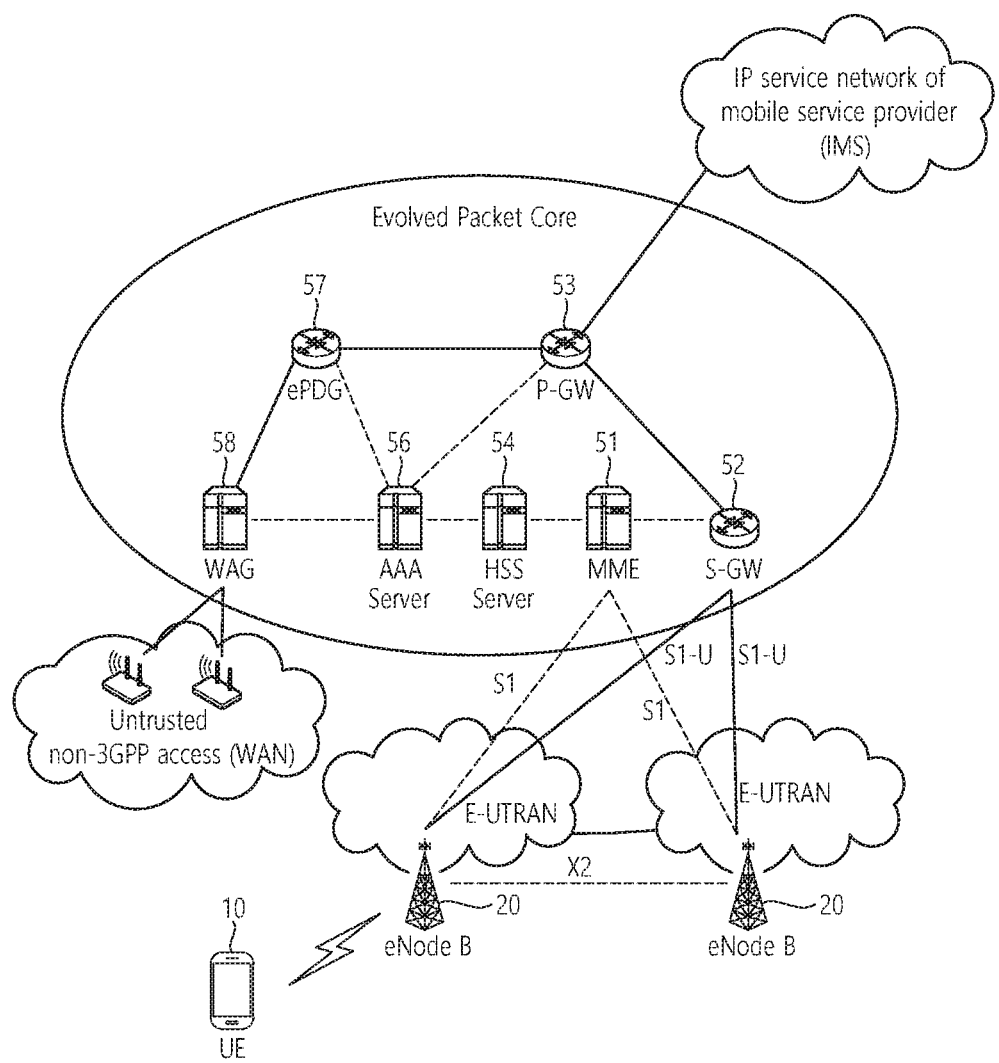
FIG. 1 shows an exemplary architecture of an evolved mobile communication network.
Figure 2:
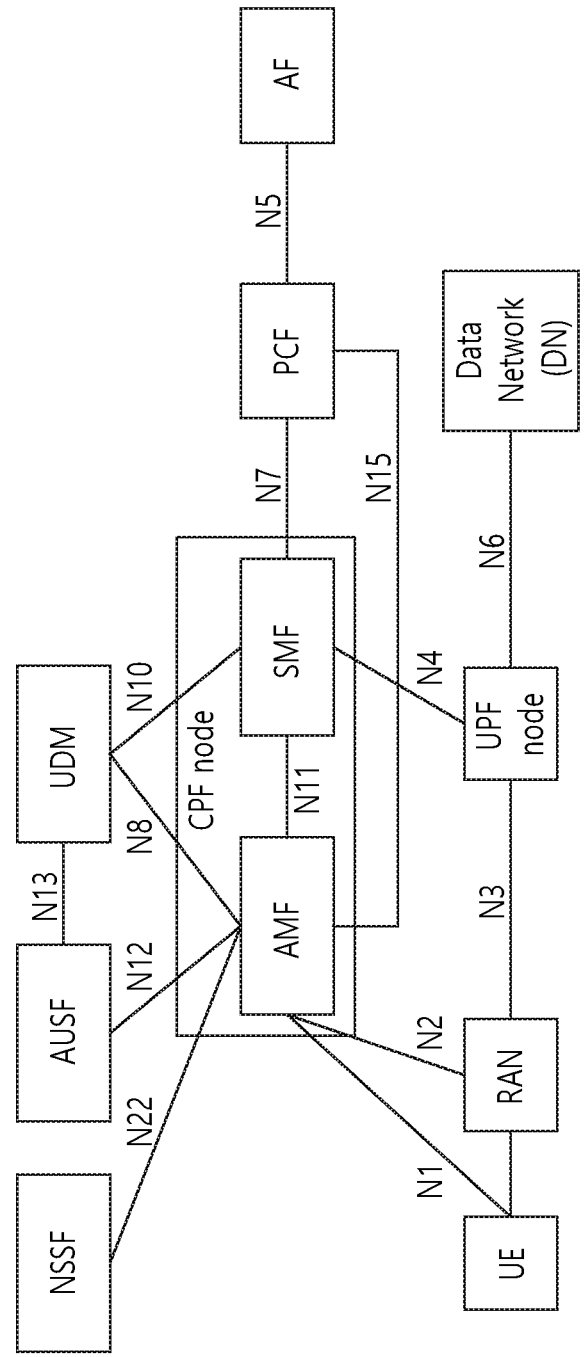
FIG. 2 is an exemplary diagram illustrating a predicted structure of a next generation mobile communication in terms of a node.
Figure 3A:
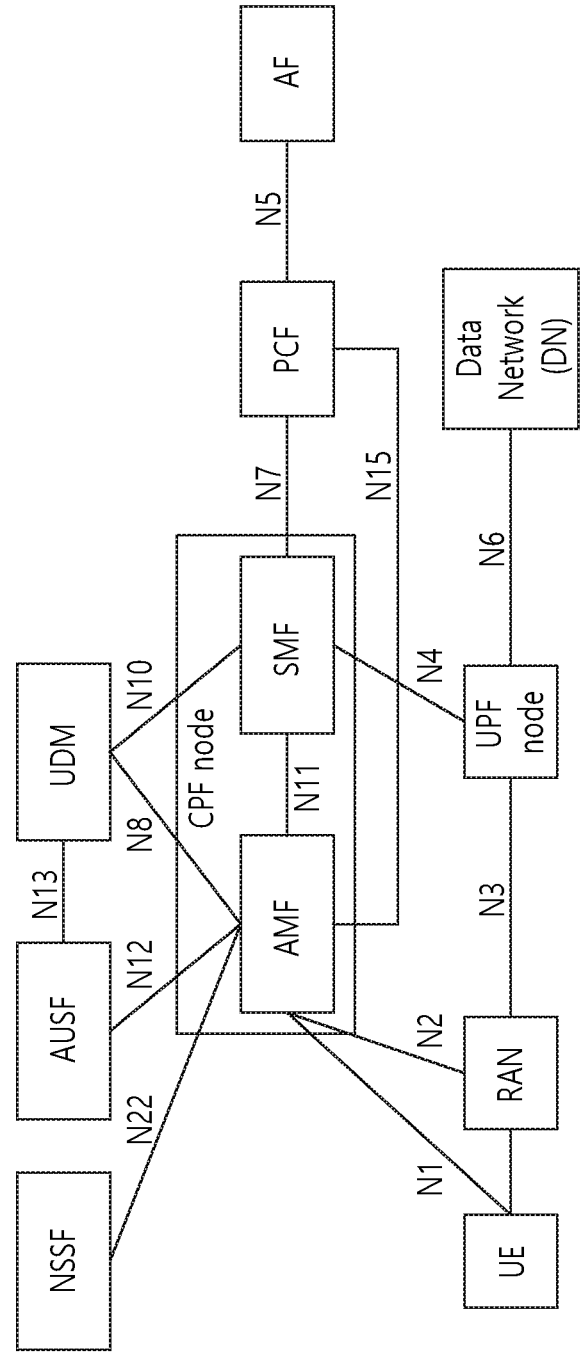
FIG. 3a is an exemplary diagram illustrating an architecture for supporting a multiple PDU session through two data networks and FIG. 3b is an exemplary diagram illustrating an architecture for supporting a concurrent access through two data networks.
Figure 3B:
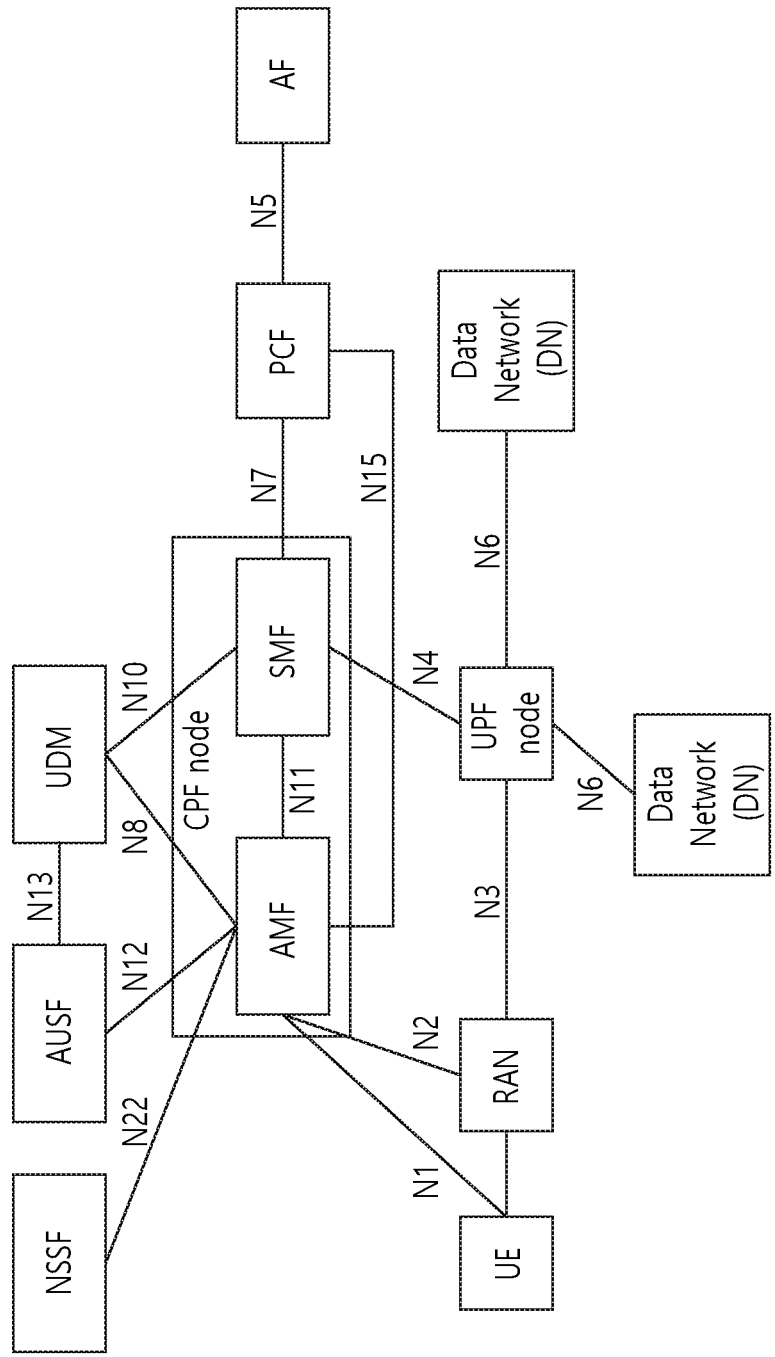

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the appended drawings, although a User Equipment (UE) is illustrated as an example, the UE shown in the drawings may be referred to as other terms, such as a UE (100) (terminal), a mobile equipment (ME), and so on.

Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Definition of Terms

Hereinafter, before describing the present disclosure with reference to the accompanying drawings, the terms used in the present disclosure will be briefly defined to facilitate understanding of the present disclosure.

UE/MS: means User Equipment/Mobile Station, or UE (100) device.

EPS: As an abbreviation of evolved packet system, means a core network supporting a Long Term Evolution (LTE) network. EPS may mean a network of a form in which UMTS is evolved.

Public Data Network (PDN): Independent network in which a server providing a service is located.

Packet Data Network Gateway (PDN-GW): Network node of the EPS network performing UE IP address allocation, Packet screening & filtering, and Charging data collection functions Serving Gateway (Serving GW): Network node of an EPS network performing Mobility anchor, Packet routing, Idle mode packet buffering, and Triggering MME to page UE functions eNodeB: Base station of the Evolved Packet System (EPS) installed outdoors and a cell coverage scale corresponds to a macro cell.

MME: As an abbreviation of mobility management entity, serves to control each entity in the EPS to provide session and mobility for the UE.

Session: A session is a path for data transmission, of which unit may be a PDN, a bearer, or an IP flow. A difference of each unit may be divided into a whole target network unit (APN or PDN unit), a unit (bearer unit) distinguished as QoS within the whole target network unit, and a destination IP address unit, as defined in 3GPP.

APN: As an abbreviation of Access Point Name, provided to the UE as a name of an access point managed by a network. That is, APN is a character string that refers to or identifies PDN. In order to access the requested service or network (PDN), the APN passes through corresponding P-GW and is a name (character string) pre-defined in the network so as to find the P-GW. For example, the APN may become a form such as internet.mnc012.mcc345.gprs.

PDN connection: represents connection from the UE to the PDN, i.e., an association (connection) of the UE expressed by an ip address and the PDN expressed by the APN. This means an entity-to-entity connection (UE (100)-PDN GW) in the core network so that the session may be formed.

UE Context: Context information of the UE used for managing the UE in the network, that is, context information constituted by UE ID, mobility (current location, etc.), session attributes (QoS, priority, etc.).

Non-Access-Stratum (NAS): Higher stratum of control plane between the UE and the MME. The NAS supports mobility management, session management, IP address maintenance, etc., between the UE and the network.

PLMN: As an abbreviation of Public Land Mobile Network, means an identification number of the network of the operator. In a roaming situation of the UE, the PLMN is divided into Home PLMN (HPLMN) and Visited PLMN (VPLMN).

DNN: As an abbreviation of Data Network Name, provided to the UE as the name of the access point managed by the network similarly to the APN. In a 5G system, the DNN is used equivalently to the APN.

Contents to be described below in this specification may be applied to a next-generation (so called, 5 generation or 5G) mobile communication network.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 6A:
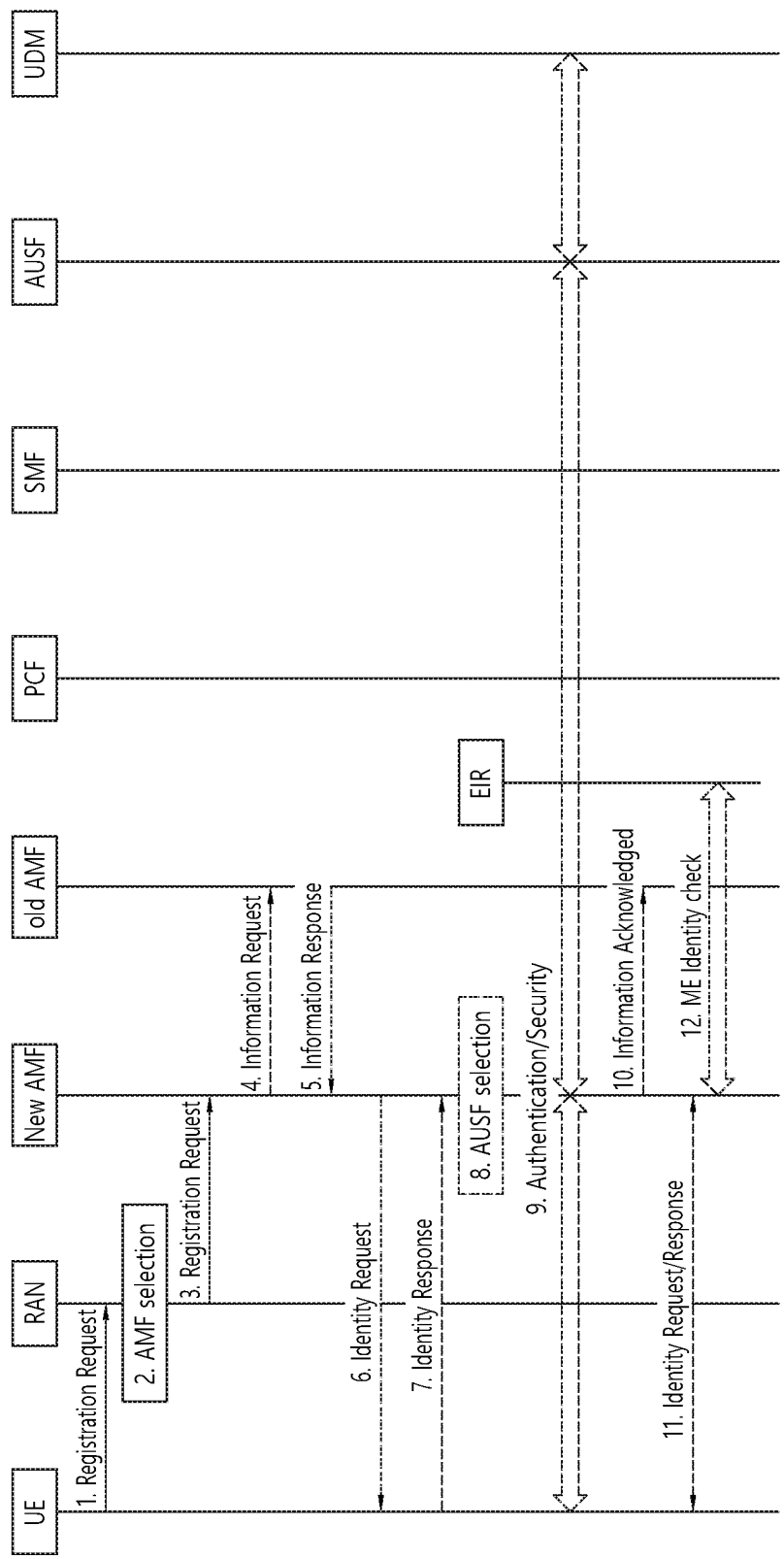
FIG. 6a is a signal flow chart showing an exemplary registration procedure.
Figure 6B:
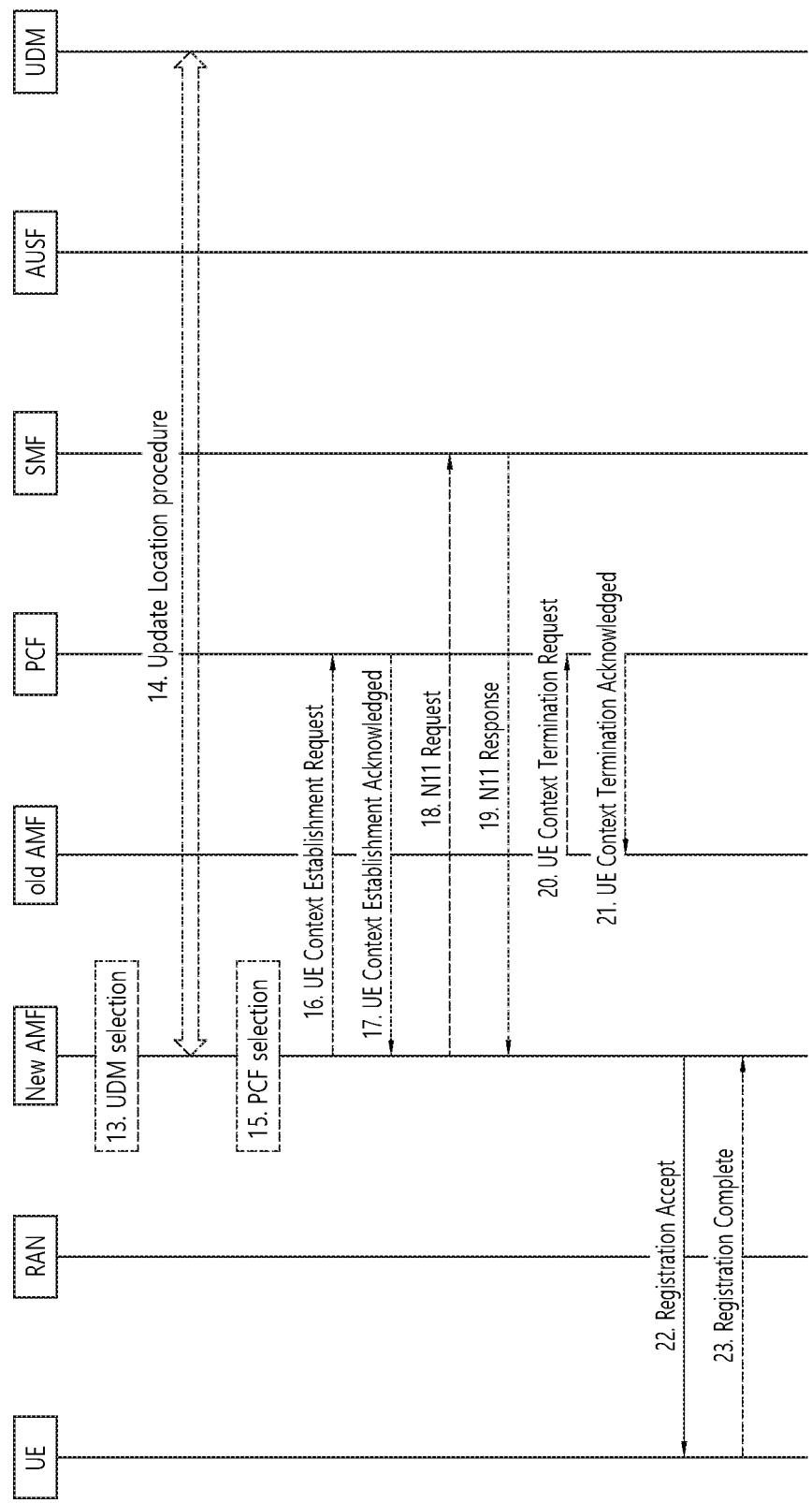

FIG. 6a is a signal flow chart showing an exemplary registration procedure. And, FIG. 6b is a signal flow chart showing an exemplary registration procedure continuing from FIG. 6a.

Figure 4A:
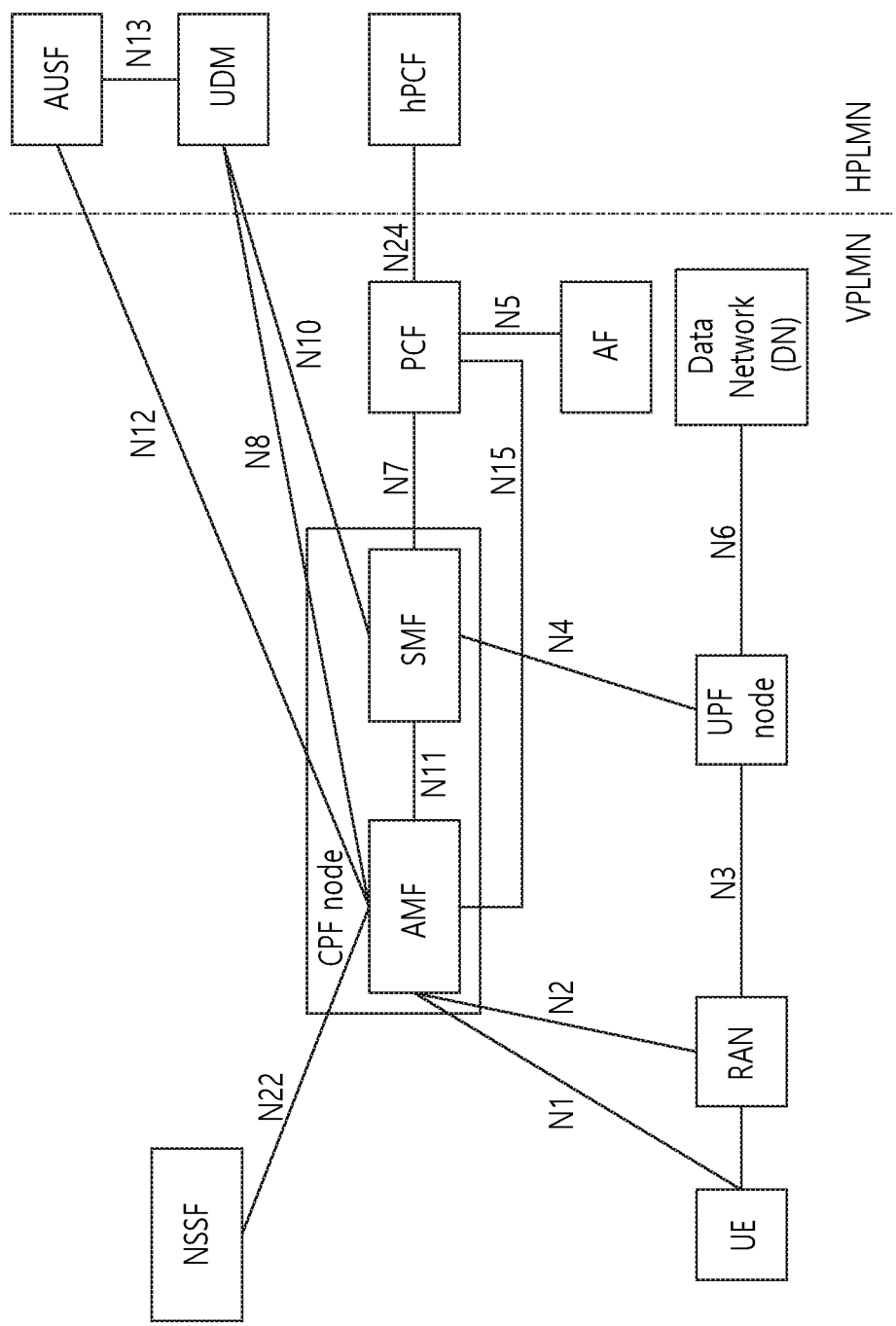
FIG. 4a is an exemplary diagram illustrating an architecture to which a local breakout (LBO) scheme is applied during roaming and FIG. 4b is an exemplary diagram illustrating an architecture to which a home routed (HR) scheme is applied during roaming.
Figure 4B:
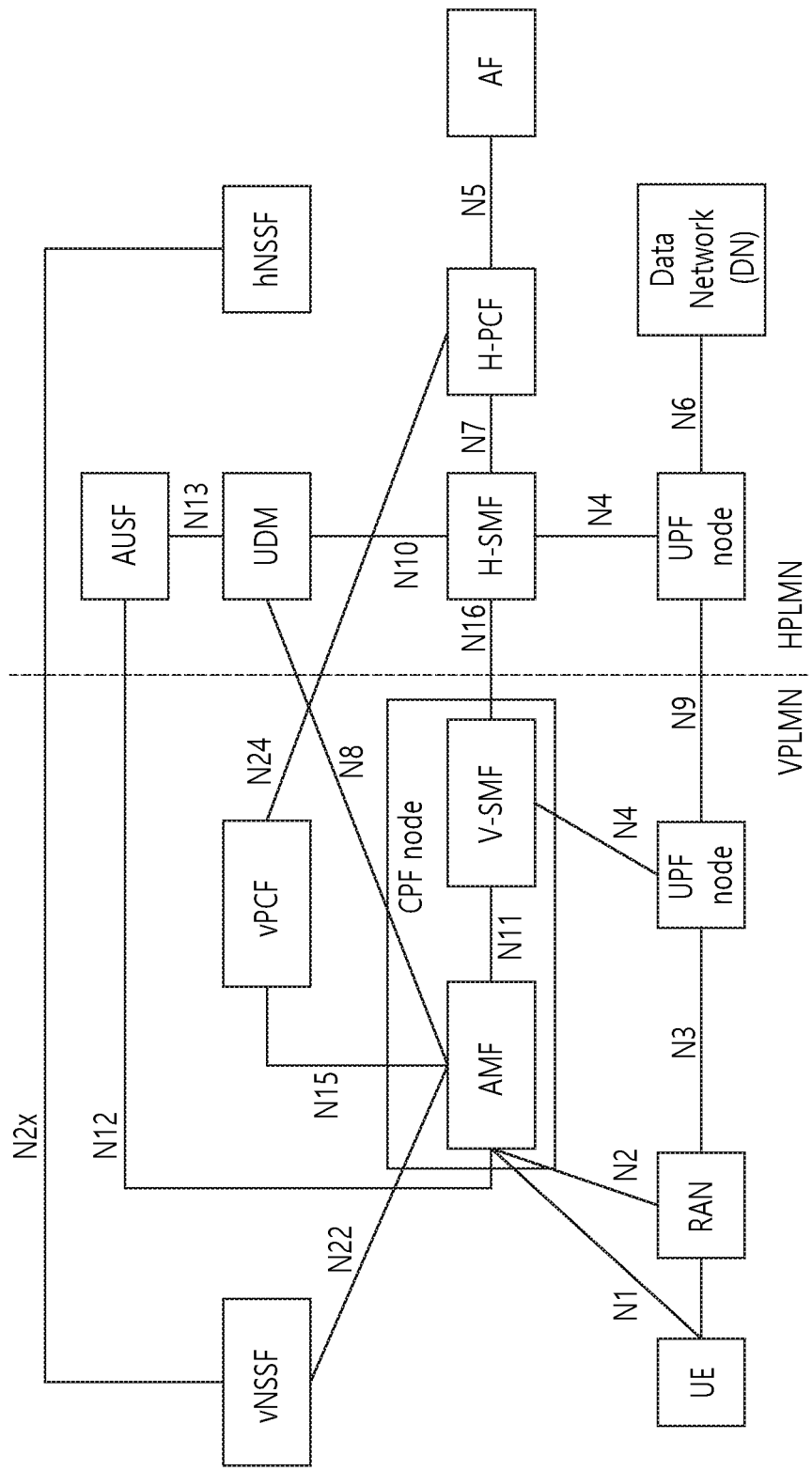
Figure 5A:
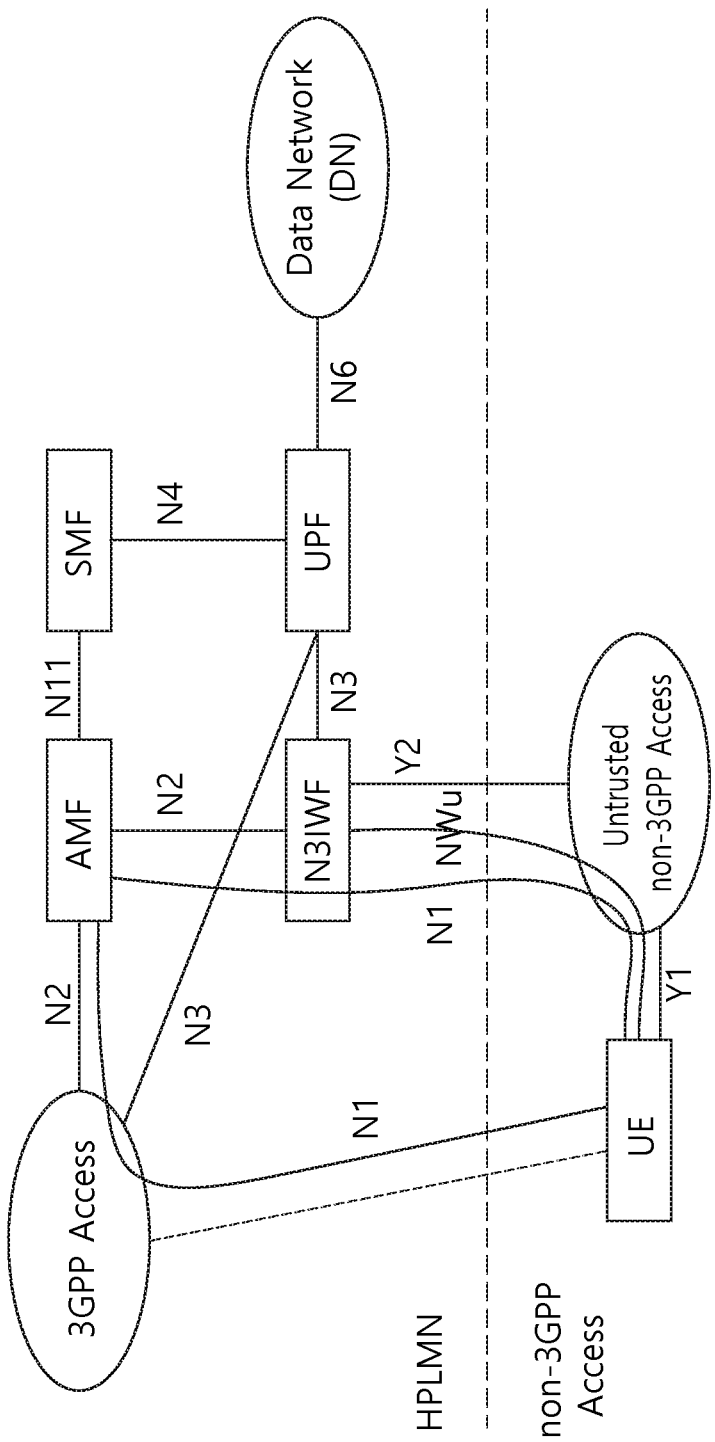
FIGS. 5a to 5f illustrate architectures for detouring data to a non-3GPP network.
Figure 5B:
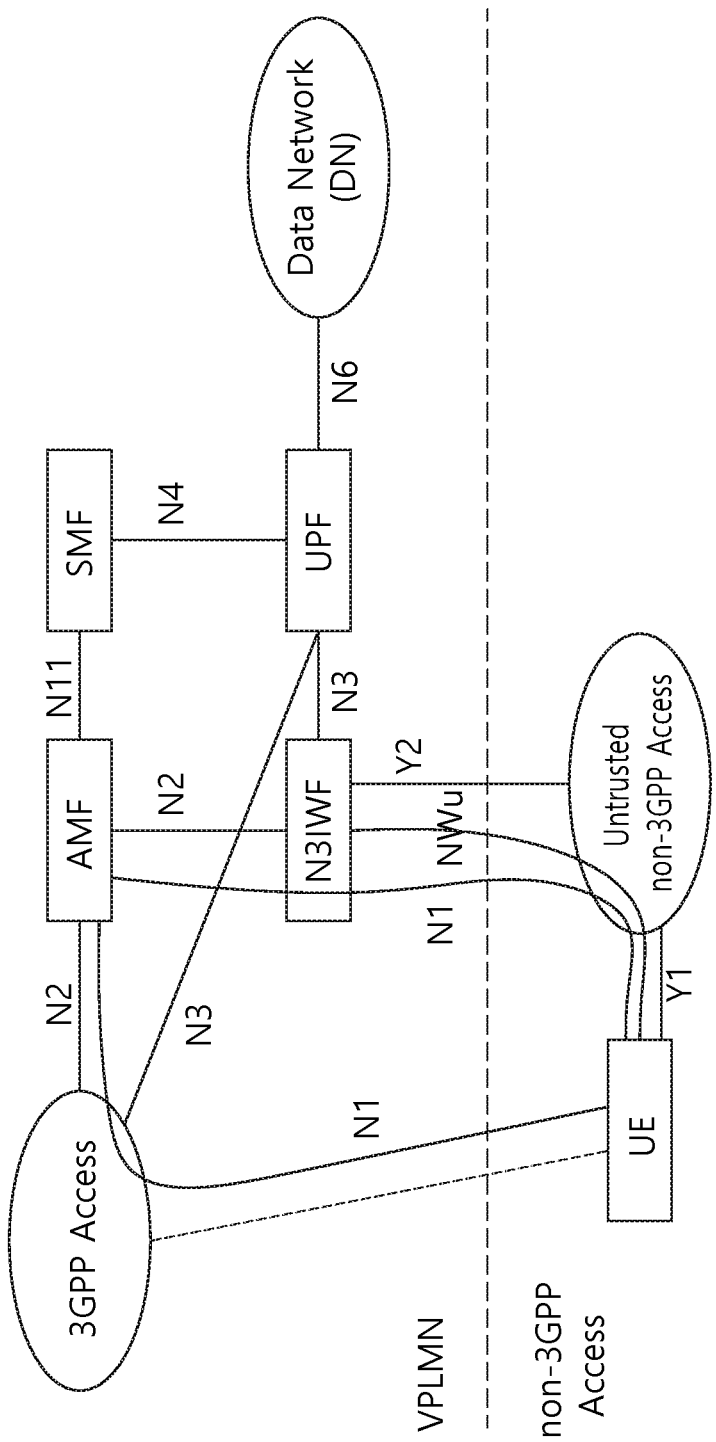
Figure 5C:
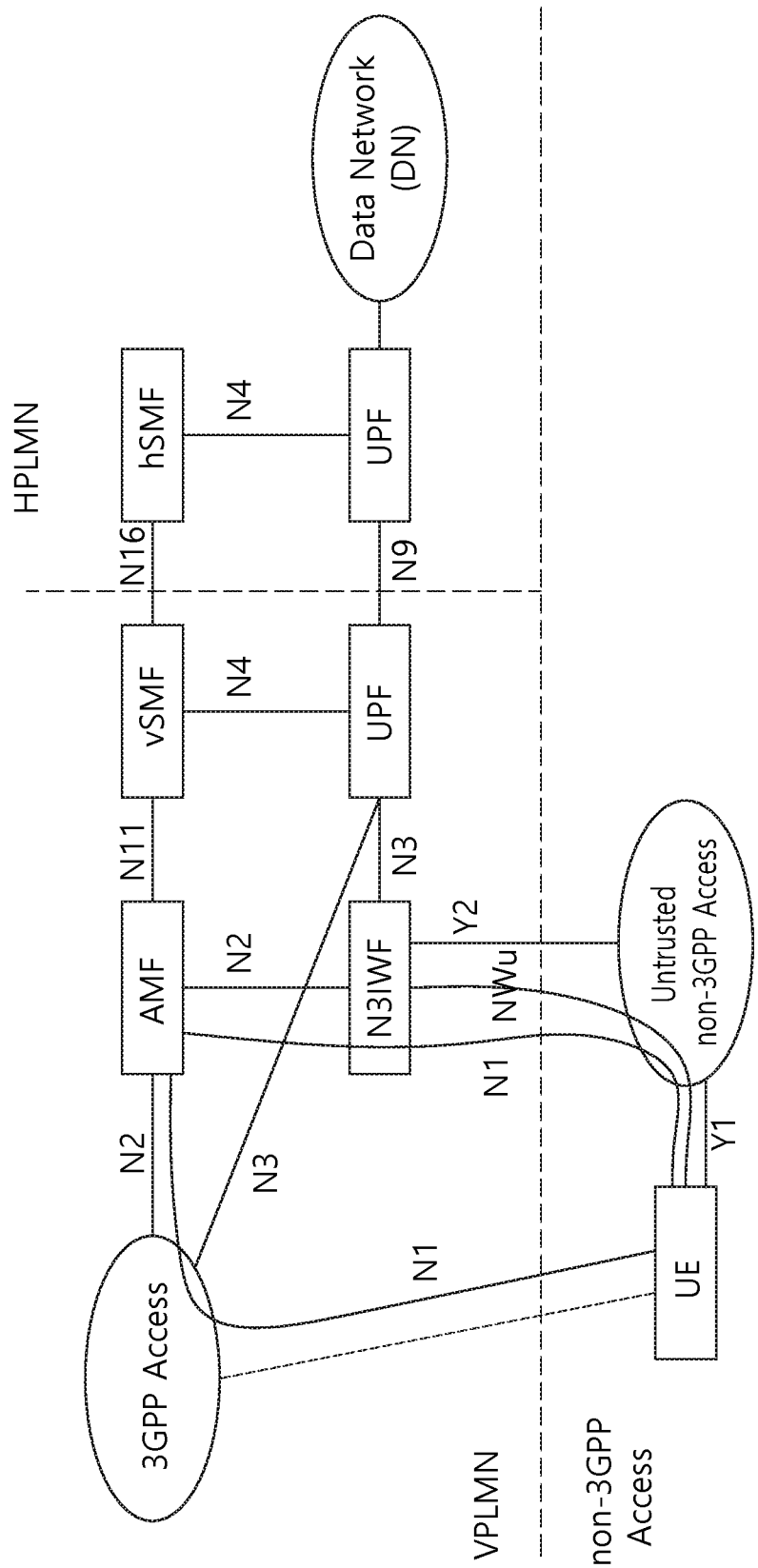
Figure 5D:
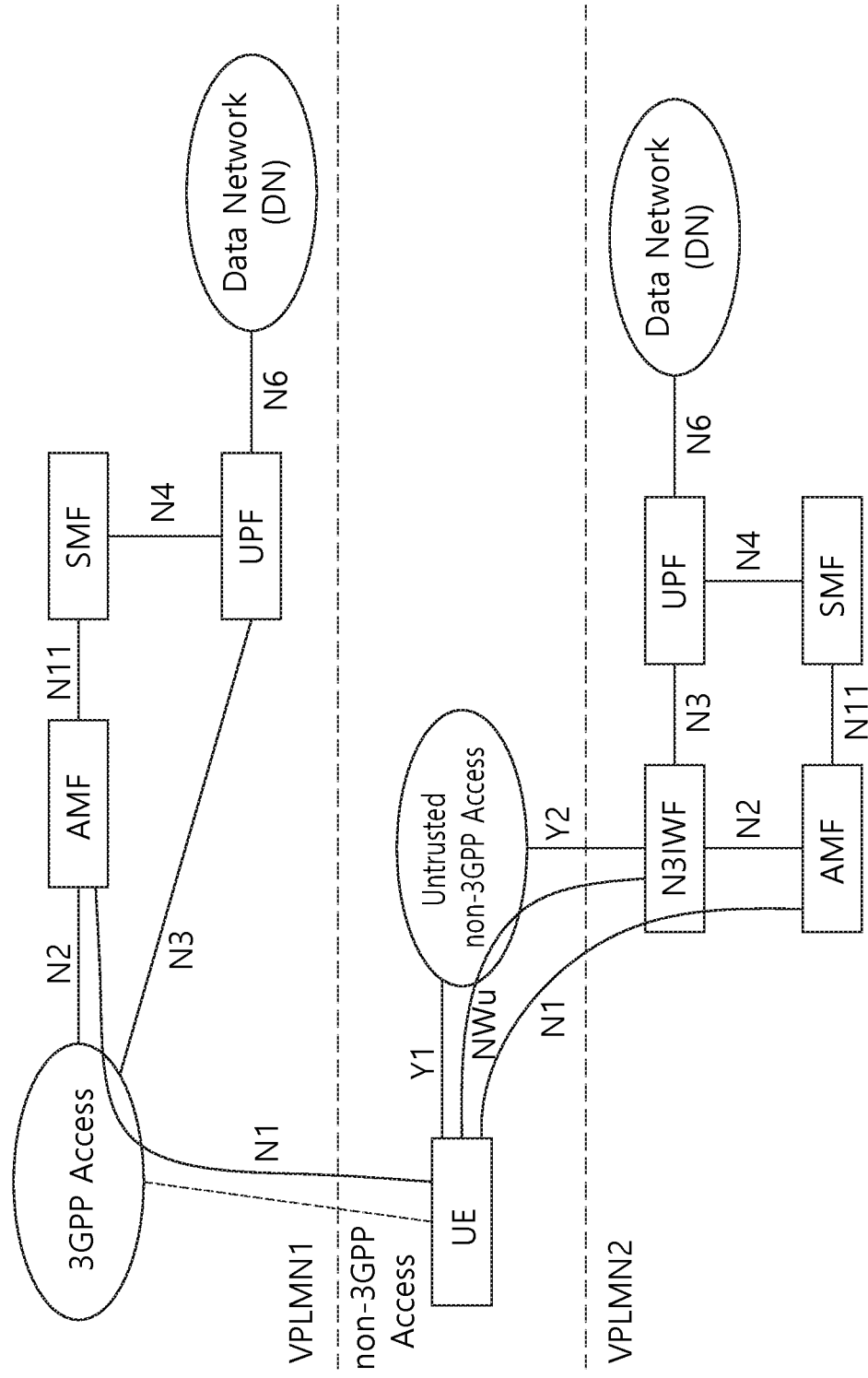
Figure 5E:
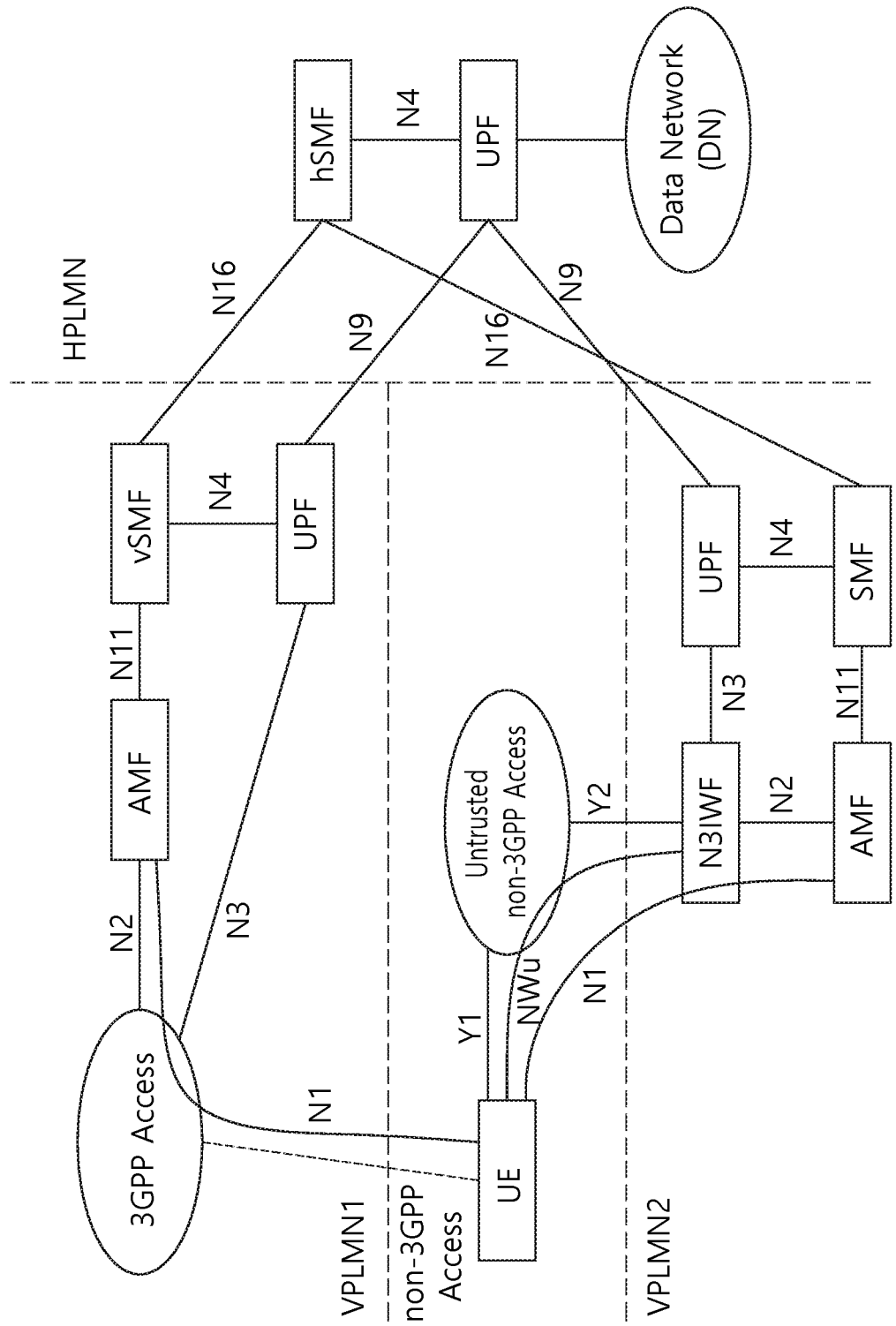
Figure 5F:
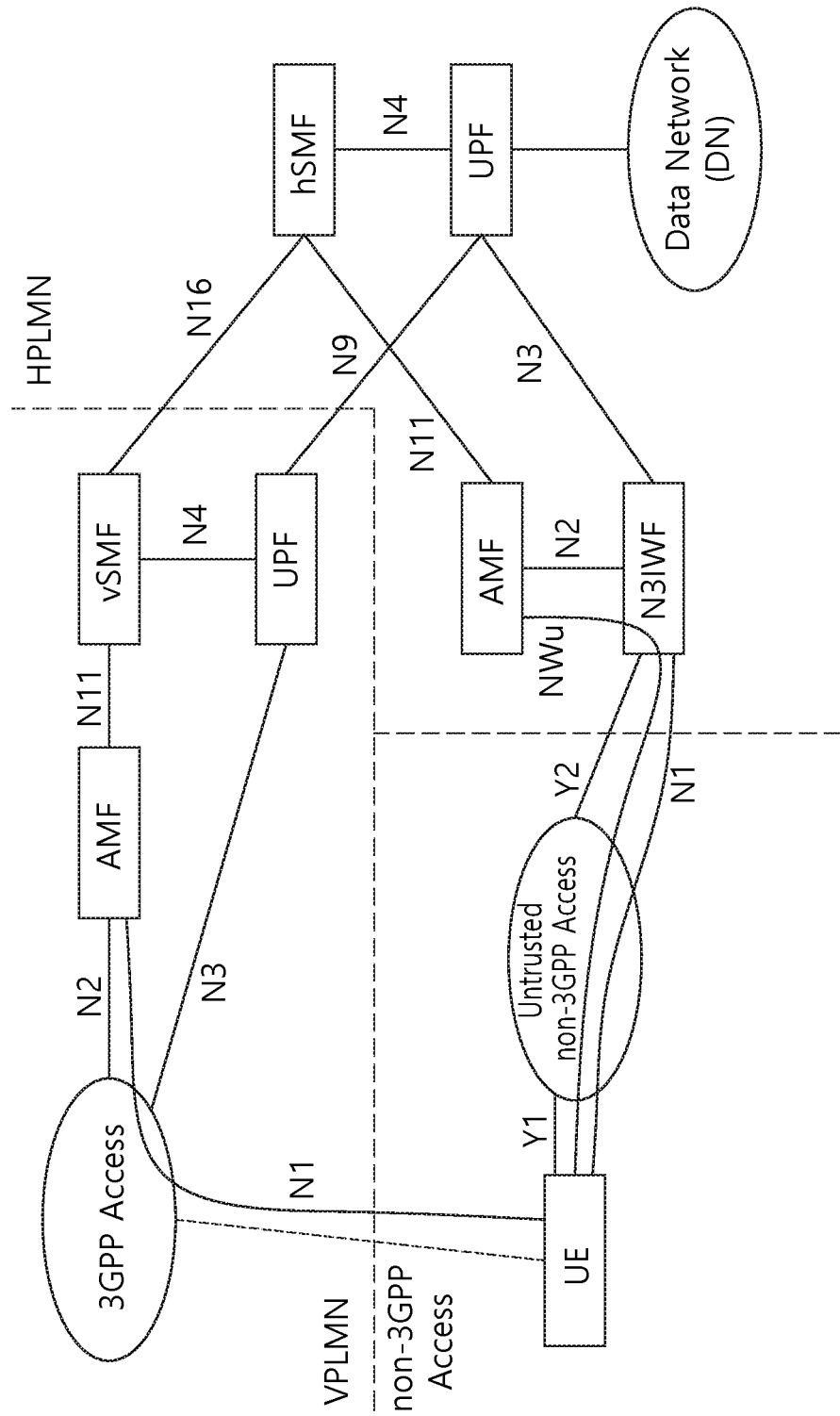

For reference, the registration procedure shown in FIG. 6a and FIG. 4b is exemplary, and, therefore, the scope of this specification will not be limited only to this. More specifically, the registration procedure may be performed while omitting the process steps shown in FIG. 6a and FIG. 6b, or the process steps shown in FIG. 6a and FIG. 6b may be modified and then performed, or process steps that are not shown in FIG. 6a and FIG. 6b may be performed along with the process steps shown in the drawings.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 7A:
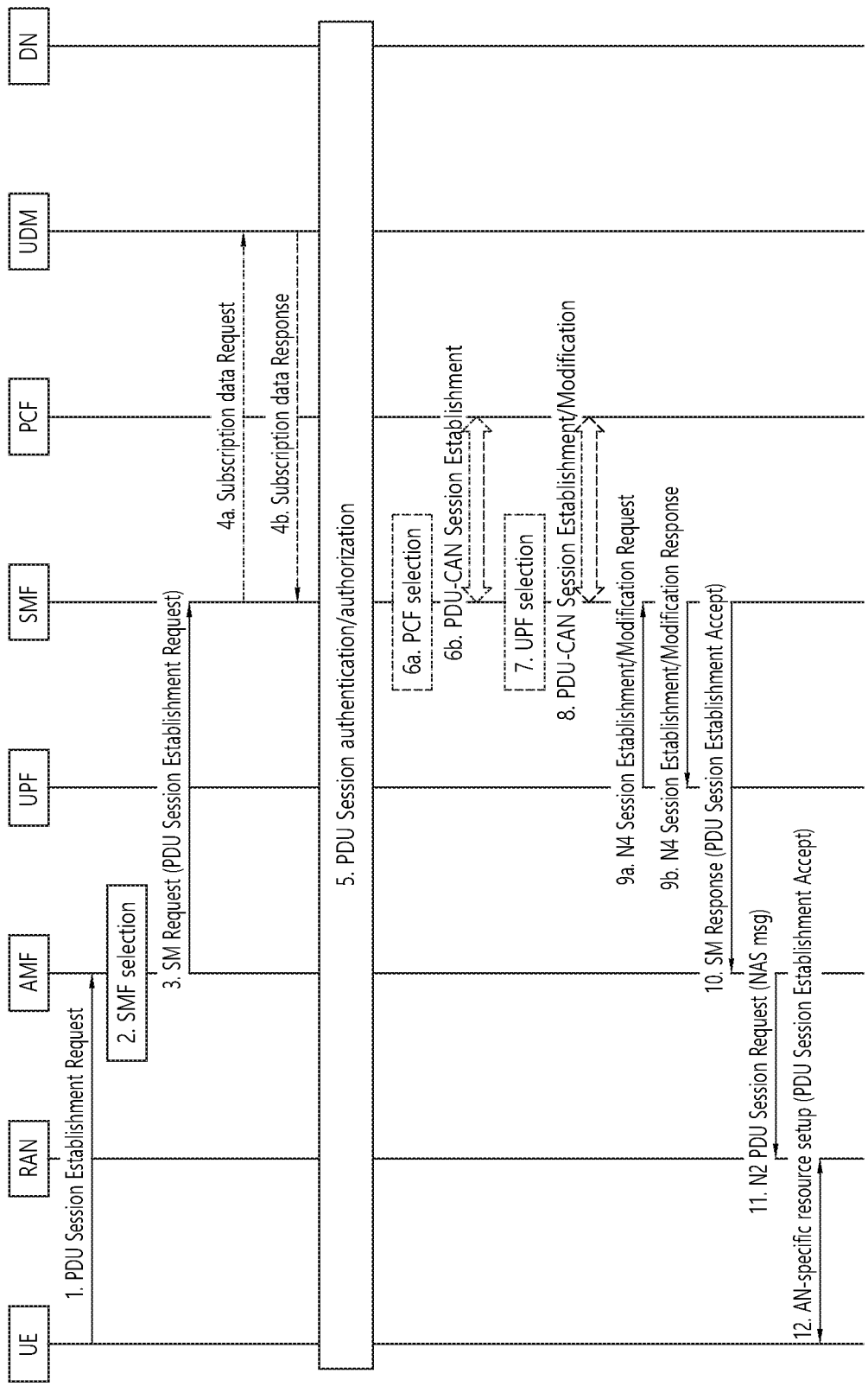
FIG. 7a is a signal flow chart showing an exemplary PDU Session Establishment procedure.

FIG. 7a is a signal flow chart showing an exemplary PDU Session Establishment procedure. And, FIG. 7b is a signal flow chart showing an exemplary PDU Session Establishment procedure continuing from FIG. 7a.

Figure 7B:
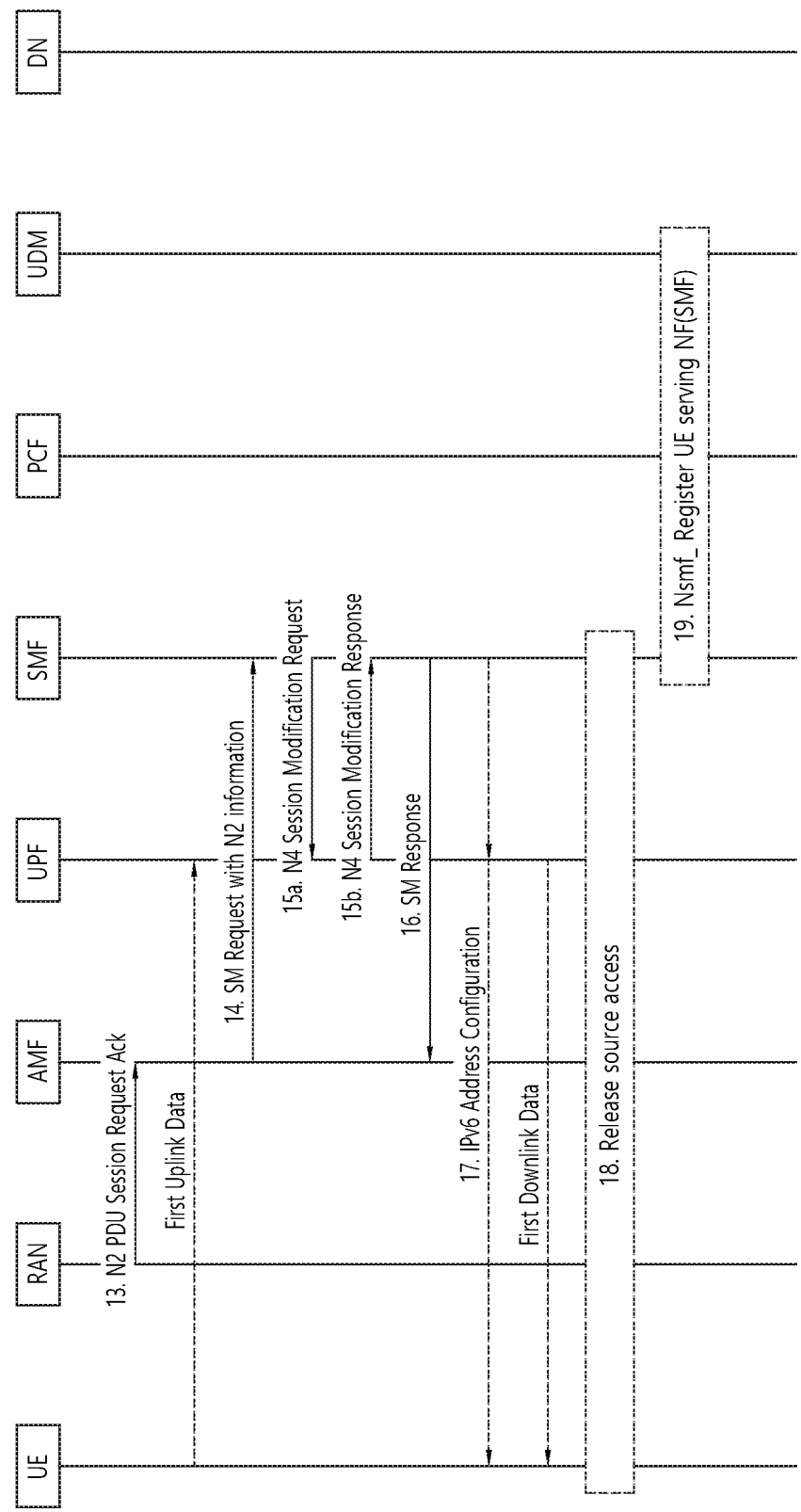

In the procedure shown in FIG. 7a and FIG. 7b, it will be assumed that, according to the Registration procedure shown in FIG. 4a and FIG. 4b, the UE has already been registered in the AMF. Therefore, it will be assumed that the AMF has already obtained the user subscriber data from the UDM. For reference, the PDU Session Establishment procedure shown in FIG. 7a and FIG. 7b is exemplary, and, therefore, the scope of this specification will not be limited only to this. More specifically, the PDU Session Establishment procedure may be performed while omitting the process steps shown in FIG. 7a and FIG. 7b, or the process steps shown in FIG. 7a and FIG. 7b may be modified and then performed, or process steps that are not shown in FIG. 7a and FIG. 7b may be performed along with the process steps shown in the drawings.

1) The UE transmits a NAS message to the AMF. The message may include Single-Network Slice Selection Assistance Information (S-NSSAI), DNN, PDU session ID, a Request type, N1 SM information (including PDU Session Request), and so on.

In order to establish anew PDU session, the UE may generate anew PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<UE Route Selection Policy (USRP)>

1. Description of Structure of URSP Information Related to URSP

URSP includes prioritized URSP rules. Table 3 below is an example of describing the URSP rules.

TABLE 3

| Information name | Description | Category | PCF permitted to modify in a URSP | Range |
|---|---|---|---|---|
| URSP rules | One or more URSP rules specified in Table 4 | Mandatory | Yes | UE context |

The structures of the URSP rules in Table 3 are described in Tables 4 and 5 below. In Table 4, the URSP rule is described.

TABLE 4

| Information name | Description | Category | Whether PCF is allowed to modify in UE context | Range |
|---|---|---|---|---|
| Rule Precedence | Determines the order the URSP rule is enforced in the UE | Mandatory (note 1) | Yes | UE context |
| Traffic descriptor - includes application descriptor, IP descriptor, domain descriptor, non-IP descriptor, DNN, and connection capability | This part defines the Traffic descriptor components for the URSP rule. | Mandatory (note 3) | | |
| Application descriptors | It consists of Operating System Identifier (OSId) and OS specific Application Identifier (OSAppId)(s) (note 2) | Optional | Yes | UE context |
| IP descriptors (note 5) | Destination IP 3 tuple(s)) (IP address or IPv6 network prefix, port number, protocol ID of the protocol above IP | Optional | Yes | UE context |
| Domain descriptors | Fully Qualified Domain Name (Destination FQDN(s)) | Optional | Yes | UE context |
| Non-IP descriptors (Note 5) | Descriptor(s) for destination information of non-IP traffic | Optional | Yes | UE context |
| Data network name (DNN) | This is matched against the DNN information provided by the application. | Optional | Yes | UE context |
| Connection Capabilities | This is matched against the information provided by a UE application when it requests a network connection with certain capabilities (note 4). | Optional | Yes | UE context |
| List of Route Selection Descriptors | A list of Route Selection Descriptors. The components of a Route Selection Descriptor are described in table 5. | Mandatory | | |

(note 1) to (note 5) of Table 4 are as follows:
(note 1):
Rules in a URSP shall have different precedence values.
(note 2):
The application descriptor is used to identify the Application(s) that is(are) running on the UE's OS. The OSId does not include an OS version number. The OSAppId does not include a version number for the application.
(note 3):
At least one of the Traffic descriptor components shall be present.
(note 4):
The format and some values of Connection Capabilities, e.g. "ims", "mms", "internet", etc., are defined in 3GPP TS 24.526. One or more connection capability values can be provided.
(note 5):
A URSP rule cannot contain the combination of the Traffic descriptor components IP descriptors and Non-IP descriptors.

TABLE 5

In Table 5, a route selection descriptor is described.

| Information name | Description | Category | PCF permitted to modify in a URSP | Range |
|---|---|---|---|---|
| Route Selection Descriptor Precedence | Determines the order in which the Route Selection Descriptors are to be applied | Mandatory (NOTE 1) | Yes | UE context |
| Route selection components | This part defines route selection components | Mandatory (NOTE 2) | | |
| SSC mode selection | One single value of SSC mode (NOTE 5) | Optional | Yes | UE context |
| Network slice selection | Either a single value or a list of values of S-NSSAI(s) | Optional (NOTE 3) | Yes | UE context |
| DNN selection | Either a single value or a list of values of DNN(s) | Optional | Yes | UE context |
| PDU session type selection | One single value of PDU Session Type | Optional | Yes | UE context |
| Non-Seamless Offload indication | Indicates if the traffic of the matching application is to be offloaded to non-3GPP access outside of a PDU Session | Optional (NOTE 4) | Yes | UE context |
| Access Type preference | Indicates the preferred Access Type (3GPP or non-3GPP) when the UE establishes a PDU Session for the matching application. | Optional | Yes | UE context |

In Table 5, (NOTE 1) to (NOTE 5) are as follows: -
(NOTE 1):
Every Route Selection Descriptor in the list shall have a different precedence value.
(NOTE 2):
At least one of the route selection components shall be present.
(NOTE 3):
When the Subscription Information contains only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components shall be included in the Route Selection Descriptor.
(NOTE 5):
The SSC Mode 3 shall only be used when the PDU Session Type is IP.

Each URSP rule includes a traffic descriptor (including one or more of the components described in Table 4). Here, the traffic descriptor determines when the URSP rule is applicable. The URSP rule is applicable when all components of the traffic descriptor match the corresponding information provided by the application.

The URSP rule is inapplicable when a any component in the traffic descriptor corresponds to the following case:
  No corresponding information from the application is available; or
  The corresponding information from the application does not match any of the values in the Traffic descriptor component.

Note 1: It is recommended to avoid listing more than two components in the Traffic descriptor of a URSP rule.

If a URSP rule is provided that contains a Traffic descriptor with two or more components, it is recommended to also provide URSP rule(s) with lower precedence and a Traffic descriptor with less components, in order to increase the likelihood of URSP rule matching for a particular application.

Each URSP rule includes a list of route selection descriptors including one or more route selection descriptors. Here, one or more route selection descriptors different precedence values. The route selection descriptor includes at least one of the following components:
  SSC mode: The SSC mode indicates that the traffic of the matching application should be routed through the PDU session (supporting the SSC mode included in the component).
  Network slice selection: The network slice selection indicates that the traffic of the matching application should be routed through the PDU session supporting the included S-NSSAI. The network slice selection includes one or more S-NSSAIs.
  DNN selection: The DNN selection indicates that the traffic of the matching application should be routed through the PDU session supporting the included DNN. The DNN selection includes one or more DNNs. When the DNN is used in the traffic descriptor, the route selection descriptor of the rule does not include a DNN selection component.
  PDU session type selection: The PDU session type selection indicates that the matching application should be routed through the PDU session supporting the included PDU session type.
  Non-continuous offload indication: When the URSP rule is applied, the non-continuous offload indication indicates that the matching application should be offloaded to the non-3GPP access outside the PDU session. When this component is present in the route selection descriptor, no other components may be included in the route selection descriptor.
  Access type preference: When the URSP rule is applied and the UE needs to establish the PDU session, the access type preference indicates in which access type (3GPP or non-3GPP) the PDU session should be established.

Note 2: The structure of the URSP does not define how the PCF partitions the URSP when the URSP may not be delivered in one NAS message.

Note 3: It is expected that a UE application may not change or disregard the PDU session parameter in the URSP rule. The UE application may indicate a preference level when requesting network connection (may be mapped to a specific PDU session parameter by the URSP rule).

When the network rejects a PDU session establishment request, the UE may trigger new PDU session establishment based on a rejection cause and the URSP policy. When the PCF provides the URSP rule to the UE, one URSP rule with "match all" traffic descriptor may be included.

Note 4: When the URSP rule including a network slice selection policy (NSSP) is applicable to the UE, if the URSP rule with the "match all" traffic descriptor is not a part of the URSP rule, the UE application may not request the network connection.

The URSP rule with the "match all" traffic descriptor is used for routing the traffic of the application which does not match other URSP rules. Therefore, the URSP rule with the "match all" traffic descriptor should be evaluated as a last URSP rule, i.e., a lowest priority. Only one route selection descriptor should be present in the URSP rule. The route selection descriptor of the URSP rule includes at most one value for each route selection component.

Note 5: For a method for configuring the URSP rule with the "match all" traffic descriptor, 3GPP TS 24.526 may be referred to.

2. Configuring and Providing URSP

The UE may receive the URSP rule from the PCF of the HPLMN. When the UE is roaming, the PCF of the HPLMN may update the URSP rule in the UE. Additionally, the UE may be preconfigured with the URSP rule (for example, may be preconfigured by the operator).

When there are the URSP rule provided by the PCF and the preconfigured URSP rule, the UE may use only the URSP rule provided by the PCF.

3. Procedure of UE of Associating Application with PDU Session Based on URSP

For all newly detected applications, the UE evaluates the URSP rule according to a rule precedence and determines whether the application matches the URSP rule.

When it is determined that the URSP rule is applicable to a specific application, the UE may select the route selection descriptor in the URSP according to a route selection descriptor precedence.

When a valid route selection descriptor is discovered, the UE determines whether there is an existing PDU session matching all components of the selected route selection descriptor.

The UE compares the selected route selection descriptor with the existing PDU session as follows:

For a component (e.g., SSC mode) including only one value, the value of the PDU session should match a value designated in the route selection descriptor.

For a component including a list of values, the value of the PDU session should match one of the values designated in the route selection descriptor.

When there is the matched PDU session, the UE associates the application with the existing PDU session. That is, the traffic of the detected application is routed to the PDU session.

When the UE determines that there are one or more matched PDU sessions (for example, when the selected route selection descriptor designates only the network slice selection and there is a plurality of existing PDU sessions in the network slice selection having different DNNs), selecting and using one thereof may vary depending on UE implementation.

Note: When there is a PDU session of SSC mode 3 having the same DNN and S-NSSAI according to a PDU session anchor change procedure, the UE considers a PDU session address lifetime value when selecting the PDU session.

When there is no existing matched PDU session, the UE attempts to establish a new PDU session by using the values designated by the selected route selection descriptor. When the PDU session establishment request is accepted, the UE associates the application with the new PDU session. When the PDU session establishment request is rejected, if a different value of the rejected component in the same route selection descriptor may be used, the UE may select a different combination of values in a currently selected route selection descriptor based on the rejection cause. Otherwise, the UE may select a next route selection descriptor according to the route selection descriptor precedence.

The UE may receive the updated URSP rule and when a following specific condition is satisfied, the UE may (re) evaluate the validity of the rule in chronological order.

When the URSP is updated by the PCF

When the UE moves from the EPC to the 5GC

When the allowed NSSAI or configured NSSAI is changed

When LADN DNN applicability is changed

When the UE is registered through 3GPP or non-3GPP access

When the UE establishes the connection to the WLAN access

The route selection descriptor is regarded to be valid only when the route selection descriptor satisfies all following conditions:

if there is the S-NSSAI, the S-NSSAI is allowed NSSAI

If any DNN is present and the DNN is an LADN DNN, the UE is the area of availability of this LADN When the URSP rule is updated or the availability of the URSP rule is changed according to the above conditions, an association of the old application with the PDU session may need to be re-evaluated. The UE may also re-evaluate the association between the application and the PDU session according to the following reasons:

Periodic re-evaluation based on UE implementation

When the existing PDU session routing the traffic of the application is released based on the URSP rule When the association between the application and the PDU session is changed due to the re-evaluation, for example, when the application should be associated with another PDU session or the new PDU session needs to be established, the UE may execute the change in chronological order according to implementation. When the selected route selection descriptor includes the non-continuous offload indication and the UE establishes connection to a WLAN access, the UE may route traffic matching the traffic descriptor through the WLAN access outside the PDU session.

<Policy Delivery>

Figure 8:
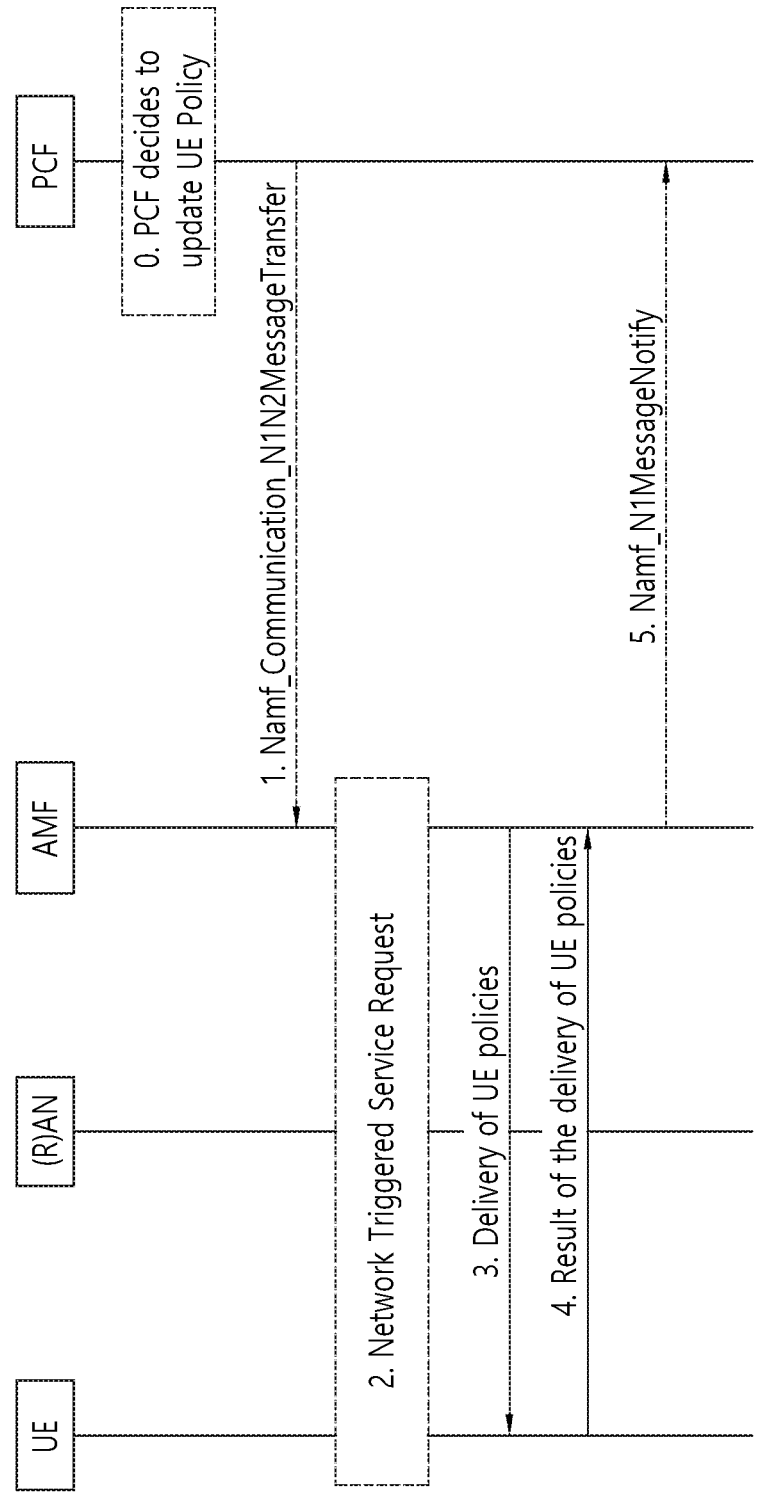
FIG. 8 is a flowchart showing an exemplary UE configuration update procedure.

FIG. 8 is a flowchart showing an exemplary UE configuration update procedure.

Here, the UE update procedure may be a procedure for transparent UE policy delivery.

The procedure is initiated when the PCF wants to update policy information related to UE access selection and PDU session selection in a UE configuration. In a non-roaming case, V-PCF is not included and a role of H-PCF is performed by the PCF. In a roaming scenario, the V-PCF interacts with the AMF and the H-PCF interacts with the V-PCF.

0) The PCF may determine to update a UE policy procedure (for example, in the case of initial registration or when there is a need of updating the UE policy) based on the following triggering condition:

In the case of the initial registration, the PCF may compare a list of a policy selection identifier included in the UE access selection and PDU session selection related policy information of request Npcf_UEPolicy-Control_Create. In addition, the PCF may determine whether UE access selection and PDU session selection related policy information should be updated and whether the UE access selection and PDU session selection related policy information should be included in a response to the AMF; and In the case of the UE policy update triggered by the network (for example, due to a change of a UE location or a change of subscribed S-NSSAI), the PCF may check a latest list of the PSI in order to determine which UE access selection and/or PDU session selection related policy should be transmitted to the UE.

The PCF checks whether a size of resulting UE access selection and PDU session selection related policy information is more than a preconfigured limit.

When the size is less than the preconfigured limit, the UE access selection and PDU session selection related policy information are included in one Namf_Communication_N1N2MessageTransfer service operation as described below.

When the size is more than the preconfigured limit, the PCF partitions the UE access selection and PDU session related policy information into smaller and logical independent UE access selection and PDU session selection related policy information (it is guaranteed that each size is less than the preconfigured limit). Each UE access selection and PDU session selection related policy information is transmitted by the Namf_Communication_N1N2MessageTransfer service operation separated as described below.

Note 1: An NAS message from the AMF to the UE does not exceed a maximum size limit allowed in NG-RAN (PDCP layer) and the preconfigured size limit in the PCF is related to the corresponding limit.

Note 2: For a mechanism used for partitioning the UE access selection and PDU session selection related policy information, 3GPP TS 29.507 may be referred to.

1) The PCF may apply the Namf_Communication_N1N2MessageTransfer service operation provided by the AMF. A Namf_Communication_N1N2MessageTransfer message may include a SUbscription Permanent Identifier (SUPI) and a UE policy container.

2) When the UE is registered and is reachable by the AMF in the 3GPP access or non-3GPP access, the AMF may transparently transmit a UE policy container to the UE through a registered and accessible access.

When the UE is registered in both the 3GPP and non-3GPP accesses and is reachable in all accesses, and served by the same AMF, the AMF may transparently transmit the UE policy container through one access of two accesses based on an AMF local policy.

When the UE is not reachable by the AMF through both the 3GPP access and the non-3GPP access, the AMF may report, to the PCF, that the UE policy container may not be delivered to the UE. For example, the AMF may report that the UE policy container may not be delivered to the UE by using Namf_Communication_N1N2TransferFailureNotification.

(i) If AMF decides to transfer transparently the UE Policy container to the UE via 3GPP access, e.g. the UE is registered and reachable by AMF in 3GPP access only, or ii) if the UE is registered and reachable by AMF in both 3GPP and non-3GPP accesses served by the same AMF and the AMF decides to transfer transparently the UE Policy container to the UE via 3GPP access based on local policy, and the UE is in CM-IDLE and reachable by AMF in 3GPP access, the AMF starts the paging procedure by sending a Paging message. Upon reception of paging request, the UE shall initiate the UE Triggered Service Request procedure.

3) When the UE is in a CM-CONNECTED state via the 3GPP access or non-3GPP access, the AMF may transparently transmit, to the UE, the UE policy container (UE access selection and PDU session selection related policy information) received from the PCF. The UE policy container may include a list of policy selection.

4) The UE may update the UE policy provided by the PCF and transmit a result to the AMF.

5) When the AMF receives the UE policy container and receives subscribed PCF in order to receive a notification of receiving the UE policy container, the AMF may deliver the response of the UE to the PCF by using Namf_N1MessageNotify.

The PCF may maintain the latest list of the PSI delivered to the UE and update a latest list of the PSI by using a Nudr_DM_Update (SUPI, Policy Data, Policy Set Entry, updated PSI data) service operation.

<Local Area Data Network (LADN)>

The LADN is a data network that may be accessed by the UE only at a specific location. The LADN provides connection for specific DNN and the availability of the LADN is provided to the UE.

The access from the LADN to the DN through the PDU session is possible only in a specific LADN service area. The LADN service area is a set of TAs. The LADN is a service provided by a serving PLMN. The LADN includes:

The LADN service is applied only to 3GPP accesses, not to a Home Routed case.

The use of LADN DNN requires an explicit subscription to the DNN or subscription to a wildcard DNN.

Whether the DNN corresponds to the LADN service is an attribute of the DNN.

The UE is configured to know whether the DNN is the LADN DNN and the association between the application and the LADN DNN. The configured association may be regarded as a UE local configuration. Alternatively, the UE may obtain information related to whether the DNN is the LADN DNN from LADN information during a (re)registration procedure.

The LADN service area and LADN DNN are configured in the AMF for each DN. That is, for different UEs accessing the same LADN, the configured LADN service area is the same regardless of other factors (i.e., a registration area of the UE or UE subscription).

Note 1: When the LADN is not available even in any TA of the service area of the AMF, the AMF does not need to receive a configuration for LADN association information for the corresponding DNN.

The LADN information (e.g., LADN service area information and LADN DNN) may be provided to the UE by the AMF during a registration procedure or a UE configuration update procedure. For each LADN DNN configured in the AMF, corresponding LADN service area information may include a set of tracking areas (i.e., a set of intersections of an allocated registration area and the LADN service area) which belong to a registration area (registration area which the AMF allocates to the UE). The AMF should not generate the registration area based on the availability of the LADN.

Note 2: Since the LADN service area may include TA outside the registration area of the UE or TA outside an area served by the AMF, the LADN service area information transmitted to the UE by the AMF may include only a sub-set of the entire LADN service area.

When the UE performs a successful (re)registration procedure, the AMF may provide the LADN information to the UE based on a local configuration for the LADN (e.g., Operations And Management (OAM)), a UE location, and UE subscription information received from UDM for subscribed DNN(s). Here, the LADN information includes a list of LADNs applicable to the UE in the corresponding registration area in a registration accept message. The LADN list is determined as follows:

When both the LADN DNN and the requested LADN information are not provided in a registration request message, the LADN list is LADN DNN acquired by excluding wildcard DNN from the subscribed DNN list.

When the UE provides the LADN DNN in the registration request message, if the UE includes the LADN DNN in which the subscribed DNN is requested or the wildcard DNN is included in subscription data of the UE, the LADN list is LADN DNN requested by the UE.

Note 3: It is assumed that the application may use only one LADN DNN at the same time.

When the UE provides an indication for requesting the LADN information in the registration request message, if i) the wildcard DNN is subscribed or ii) the LADN DNN is in the subscribed DNN list and the wildcard DNN is not subscribed, the LADN list is all LADN DNN configured in the AMF.

The UE may provide the LADN DNN in order to retrieve the LADN information for the specified LADN DNN or provide the indication for requesting the LADN information in order to retrieve LADN information for all available LADNs.

During a subsequent registration procedure, when the network does not provide the LADN information for the DNN, the UE may remove the LADN information for the DNN.

When the LADN information for the UE is changed in 5GC, the AMF may update the LADN information for the UE through a UE configuration update/registration procedure.

When the AMF receives PDU session establishment with the LADN DNN or receives a service request for the established PDU session corresponding to the LADN, the AMF determines the presence of the UE in the LADN service area and when the requested DNN is configured as the LADN DNN in the AMF, the AMF delivers, to the SMF, information related to the presence of the UE in the LADN service area.

The UE may determine whether the UE is inside or outside the LADN service area based on the LADN service area information in the UE. When the UE does not have the LADN service area information for the LADN DNN, the UE may regard that the UE is outside the LADN service area.

The UE may perform the following operations.

a) When the UE is outside the LADN service area, the UE:
should not request to activate the UP connection of the PDU session for the corresponding LADN DNN.
should not establish/modify the PDU session for the corresponding LADN DNN.
does not need to release the existing PDU session for the corresponding LADN DNN unless the UE receives an explicit SM PDU session release request message from the network.

b) When the UE is inside the LADN service area, the UE:
may request to establish/modify the PDU session for the corresponding LADN DNN.
may request to activate the UP connection of the existing PDU session to the corresponding LADN DNN.

The SMF supporting the DNN may receive a configuration of information indicating whether the DNN is the LADN DNN.

Upon receiving an SM request corresponding to the LADN from the AMF, the SMF may determine whether the UE is in the LADN service area based on the indication (e.g., presence of the UE in the LADN service area) received from the AMF. When the SMF does not receive the indication, the SMF may regard that the UE is outside the LADN service area. The SMF may reject the SM request when the UE is outside the LADN service area.

When the SMF receives a request for establishing the PDU session together with the LADN DNN, the SMF should subscribe to "UE mobility event notification" by providing the LADN DNN to the AMF in order to report the presence of the UE in an area of interest.

Based on the notification for the presence of the UE in the LADN service area known by the AMF, the SMF may perform the following operations based on an operator's policy.

a) When the SMF receives a notification that the presence of the UE in the LADN service area is OUT (the UE does not exist in the LADN service area), the SMF:
immediately releases the PDU session; or
deactivates user plane connection of the PDU session while maintaining the PDU session and confirms that data notification is deactivated and when not receiving a notification that the UE moves into the LADN service area after a predetermined time, the SMF may release the PDU session.

b) When the SMF receives a notification that the presence of the UE in the LADN service area is IN (the UE exists in the LADN service area), the SMF:
may check whether the data notification is activated.
When the SMF receives downlink data or receives the data notification from the UPF, the SMF may trigger a network triggered service request for the LADN PDU session.

c) When the SMF receives a notification that the presence of the UE in the LADN service area is UNKNOWN (may not know whether the UE exists in the LADN service area), the SMF:
may check whether the data notification is activated.
When the SMF receives downlink data or receives the data notification from the UPF, the SMF may trigger the network triggered service request for the LADN PDU session.

<UE Mobility Event Notification>

The 5G system supports a function of tracking and reporting a UE mobility event.

The AMF provides UE mobility related event reporting to authorized NF to subscribe to a UE mobility event reporting service. An NF service consumer that wants to receive a report related to the UE location, such as the SMF, the PCF, or the NEF may subscribe to the UE mobility event notification service of the AMF by using the following parameters.

Event reporting type specifying what should be reported for the UE mobility (e.g., the UE location and the UE mobility on area of interest)

An area of interest specifying a geographic area in the 3GPP system. The area of interest may be expressed as a list of tracking areas, a list of cells, and a list of (R)AN node identifiers. In the case of the LADN, an event consumer (e.g., SMF) may provide the LADN DNN so as to refer to the LADN service area as the area of interest. In the case of the PRA, an event consumer (e.g., SMF or PCF) may provide an identifier of the area of interest so as to refer to a pre-defined area as the area of interest.

Event reporting information: event reporting mode, the number of reports, maximum duration of reporting, and event reporting condition (e.g., when a target UE moves into a specified area of interest)

Notification address (e.g., endpoint address of an NF service consumer receiving the notification)

Target of event reporting, such as a specific UE, a group of UEs, or a predetermined UE (e.g., all UEs)

When the NF service consumer subscribes to the UE mobility event notification provided by the AMF in order to report the presence of the UE in the area of interest, the AMF may track the location of the UE by considering the CM state of the UE and using the NG-RAN procedure (when an RRC inactive state is applied to the NG-RAN) in order to determine the presence of the UE in the area of interest. When the change in the presence of the UE in the area of interest is changed, the AMF notifies the presence of the UE and a new UE location in the area of interest to the subscribed NF consumer.

When the AMF is changed, the subscription of the mobility event is transferred from the old AMF to the new AMF. When the new AMF determines that the event is reported by the old AMF based on an MM context of the UE, the new AMF may determine not to notify a current state related to the subscription of the mobility event to the SMF.

In a network deployment in which the UE may leave the area of interest or enter the area of interest without any notification to 5GC in the CM-CONNECTED state, the AMF may initiate NG-RAN location reporting or N2 notification in order to track the presence of the UE in the area of interest.

<Using Reporting of Presence of UE in Area of Interest>

Hereinafter, using the reporting of the presence of the UE in the area of interest by the SMF will be described.

When a PDU session is established or modified, or when the user plane path has been changed (e.g. UPF re-allocation/addition/removal), SMF may determine an Area of Interest, e.g., based on UPF Service Area, subscription by PCF for reporting UE presence in Presence Reporting Area, etc.

In 3GPP access, the area of interest is as follows:
List of tracking areas and/or;
Cell identifier and/or;
NG-RAN mode identifier and/or;
Present reporting area ID(s) and optional components (e.g., TA and/or NG-RAN node and/or cell identifier) of one or more presence reporting areas and/or;
LADN DNN.

In non-3GPP access, the area of interest is as follows:
Non-3GPP TAI (N3GPP TAI)

For UE location changes into or out of the "area of interest", the SMF may subscribe to the "UE Mobility Event Notification" service provided by the AMF to report the presence of the UE in the area of interest. When receiving the notification from the AMF, the SMF may determine a method for processing the PDU session (e.g., re-allocating the UPF).

In the case of LADN, the SMF may provide the LADN DNN to the AMF in order to subscribe to the "UE mobility event notification" for reporting the presence of the UE in the area of interest. When receiving the notification from the AMF, the SMF may determine the method for processing the PDU session. The AMF may transmit the location of the UE to the SMF together with the notification (e.g., for UPF selection).

In the case of policy control and charging decisions, the PCF may subscribe to event reporting from the SMF or from the AMF for the UE presence in the presence reporting area.

The presence reporting area may be as follows:
UE-dedicated Presence Reporting Area: i) may be defined in a subscriber profile and configured by a short list of TA and/or NG-RAN and/or cell identifier in PLMN. Or, ii) may be derived from the area of interest provided by an application function of the PCF and configured by the short list of TA and/or NG-RAN and/or cell identifier in PLMN; or "Core Network predefined Presence Reporting Area" pre-defined in the AMF and configured by UE-dedicated Presence Reporting Area In the case of the changes in UE presence in the presence reporting area, for the presence reporting area pre-defined by the core network, the AMF may determine the "area of interest" corresponding to a presence reporting area identifier (the list of TAI and/or cell identifier and/or NG-RAN node identifier based on a local configuration provided to the SMF by the PCF). For the UE-dedicated presence reporting area, the subscription of the UE location change notification may include the list of PRA identifiers and TA or NG-RAN node identifiers, and/or a cell identifier constituting the presence reporting area. For the presence reporting area pre-defined by the core network, the subscription to the UE location change notification for the "area of interest" should include the PRA identifier.

For the presence reporting area pre-defined by the core network, a priority (or precedence) level may be configured in the AMF. In order to prevent overload, the AMF may configure reporting to be deactivated for one or more received presence reporting areas by considering the priority (or precedence) configured in the presence reporting area pre-defined by each core network.

Note 1: Change reporting of the UE presence of the presence reporting area is not applied to home routed roaming.

The AMF may receive a configuration for the PRA identifier that refers to the set of presence reporting areas pre-defined by the core network. The PCF may subscribe to the change of the UE location of the area of interest for the set of presence reporting area and when the PCF provides the PRA identifier, the SMF displays only the PRA identifier of the area of interest to subscribe to the event reporting for the set of presence reporting area. When the presence reporting area is reported while being included in the set of reporting areas pre-defined by the core network (the AMF requests to report the change of the UE presence), the AMF may additionally add the PRA identifier of the set of presence reporting areas pre-defined by the core network so as to report the PRA identifier.

When the AMF is changed, if the PRA identifier is provided, presence reporting area components may be transmitted to the target AMF as a part of MM context information for all PDU sessions during a mobility procedure. When one or more presence reporting areas are configured to be deactivated, the target AMF may determine to reactivate one or more deactivated presence reporting areas. The target AMF may indicate, for each PDU session, whether the PRA identifier and the UE are inside or outside the presence reporting area (or deactivated presence reporting area) for the corresponding SMF/PCF.

Note 2: The target AMF may not configure the presence reporting area received from a source serving node to be deactivated.

Subscription may be maintained for the lifetime of the PDU session regardless of an UP activation state of the PDU session (e.g., regardless of whether the UP connection of the PDU session is activated or not).

The SMF may determine a new area of interest and transmit new subscription together with a new area of interest.

The SMF may release the subscription of the "UE mobility event notification" service when the PDU session is released.

<Problems to be Solved Through Disclosure of this Specification>

In order for the UE to perform communication by using the LADN, subscription information related to the LADN DNN is required in the network. Specifically, only when subscription information for specific LADN DNN is present in subscriber information, the UE may establish the PDU session for the corresponding LADN DNN and establish the established PDU session.

Since the LADN DNN is a DNN used only in a specific area (LADN service area), the home operator does not know LADN DNN information for a serving network in which the UE is roaming when the UE is roaming. As a result, there is a problem in that the UE which is roaming may not receive the service using the LADN. That is, there is a problem in that the UE which is roaming may not establish the PDU session by using the LADN.

In order to solve the problem, a method was proposed, which allows even the UE which is roaming to use the LADN by using the wildcard DNN. That is, even though the UE does not know accurate LADN DNN information, the UE may create the PDU session related to the LADN DNN by using the wildcard DNN included in the subscriber information.

Here, the wildcard DNN may be information included in the subscription information. The subscription information may include the wildcard DNN for each subscribed S-NSSAI. When the wildcard DNN is associated with the subscribed S-NSSAI, the subscription allows the UE to establish the PDU session by using a predetermined DNN value for the S-NSSAI. In other words, the wildcard DNN may be used to allow a subscriber to access a predetermined data network supported in a network slice related to the S-NSSAI.

However, there is a problem in that the UE which is roaming may not create the PDU session even when using the wildcard DNN or receiving information related to the LADN DNN from the AMF. Specifically, when a specific application requests connection to the network, the UE determines whether the new PDU session needs to be established based on the URSP. Here, only the home operator may provide the URSP to the UE. Here, the home operator does not know the information related to the LADN DNN being provided by a roaming network (network to which the UE roams). Therefore, since the UE which is roaming may not receive the URSP associated with the LADN provided in a region at which the UE is positioned, the UE may not determine whether the PDU session needs to be established. Accordingly, in spite of using the wildcard DNN in the related art, the UE may not perform an operation of establishing the PDU session.

<Disclosure of this Specification>

A disclosure of this specification aims to present methods for solving a problem in that the UE which is roaming may not establish the PDU session by using the LADN DNN.

The disclosure of this specification may be implemented by combining one or more methods/operations/configurations/steps of the followings. In addition, a proposal described below is to classify a table of contents for convenience of description. Respective proposals may be independently performed or implemented by a combination with other proposals.

I. First Proposal—Method for Providing LADN Information Including Application Information by AMF If the AMF has the LADN information, the AMF may transmit the LADN information to the UE when the UE is registered. Here, the LADN information may include information related to the application, information related to the LADN DNN associated with the application, and information related to the LADN service area associated with the LADN DNN. The information related to the application may be an application ID form or a form of a packet filter. Here, the packet filter is a filter that checks each transmitted packet and compares the packet with a preconfigured rule to determine whether data matches the preconfigured rule. The LADN information may be provided as shown in Table 6, for example.

TABLE 6

| Priority | Application | LADN DNN | LADN service area |
|---|---|---|---|
| 1 | Application ID_A | LADN DNN_X1 | TA1, TA2 |
| 2 | Application ID_A, Application ID_B | LADN DNN_X2 | TA1, TA2, TA3, TA4 |
| 3 | Application filter info_C | LADN DNN_Y | TA1, TA2 |
| 4 | Application ID_D | LADN DNN_Z | TA1, TA3 |

The LADN information provided as shown in Table 6 may be configured so that one application does not correspond to several LADN DNNs. Alternatively, when one application corresponds to several LADN DNNs, the LADN information may further include a priority value for the LADN DNN. Then, the UE receiving the application from the AMF may clearly know which LADN DNN should be used for a specific application based on the priority value. When the application used by the UE requests the connection to the network, the UE may determine the LADN DNN associated with the corresponding application based on the application information received from the AMF as in the example of Table 6 and establish the PDU session associated with the corresponding LADN DNN.

The AMF may additionally transmit the following information to the UE in addition to the application information as in the example of Table 6.

1. When there is a rule for an application which is the same as the application included in the application information in the URSP, information indicating which information is to be preferentially used. Here, the URSP means URSP provided from the home operator in the HPLMN. A case where the information is required may be, for example, a case where both HPLMN and VPLMN may provide a specific service (e.g., Netflix) and the UE receives a URSP rule for the corresponding service from the HPLMN and receives the LADN information for the corresponding service from the AMF of the VPLMN.

The UE may have both the LADN information received from the AMF and the URSP (received from the HPLMN). In a case where there is a rule for the same application in the URSP and the information related to the corresponding application is present even in the LADN information, which information is to be preferentially applied needs to be determined. The AMF may notify, to the UE, of which of the LADN information and the URSP is to be preferentially applied based on the subscriber information of the UE and/or a local configuration of the AMF.

As an example, the AMF may provide, to the UE, information indicating that the LADN information is applied preferentially over the URSP while transmitting the LADN information to the UE. Then, the UE may continuously determine which LADN DNN is to use for the specific application based on the LADN information. In addition, when the UE may not use the corresponding LADN DNN (e.g., when establishing the PDU session associated with the LADN DNN is unsuccessful or the UE is positioned outside the LADN service area), the UE may perform a procedure for establishing the PDU session by using the DNN of the corresponding rule based on the rule included in the URSP.

As another example, the AMF may provide, to the UE, information indicating that the URSP is applied preferentially over the LADN information while transmitting the LADN information to the UE. Then, the UE may perform a procedure for establishing the PDU session associated with the corresponding DNN by using the DNN of the URSP without using the LADN DNN.

The AMF may provide, to the UE, information indicating which information is to be preferentially used for each item of information included in the LADN information and the URSP. Alternatively, the AMF may provide information indicating whether any one of the LADN information or the URSP is to be preferentially used similarly for all LADN DNNs.

The AMF may notify, to the UE, which of the LADN information and the URSP is to be preferentially used by using the URSP rule instead of providing the information indicating which of the LADN information and the URSP is to be preferentially used. For example, the URSP rule may include information indicating which value of the LADN information and the URSP rule is to be preferentially applied for each rule. In this case, the same value should be entered for each item in order to similarly apply the priority between the URSP rule and the LADN information for all LADN DNNs. As a result, the amount of information which the AMF transmits to the UE may increase and the size of the URSP rule may increase. Instead, the amount of information which the AMF transmits to the UE in the registration procedure may decrease.

II. Second Proposal—Method for Providing LADN Policy by PCF

The AMF may provide the LADN information including only the information related to the LADN DNN and the information related to the LADN service area. In addition, the PCF of serving PLMN may provide the LADN policy to the UE. For example, the LADN policy is shown in Table 7.

TABLE 7

| Priority | Application | LADN DNN |
| --- | --- | --- |
| 1 | Application ID_A | LADN DNN_X1 |
| 2 | Application ID_A, Application ID_B | LADN DNN_X2 |

TABLE 7-continued

| Priority | Application | LADN DNN |
| --- | --- | --- |
| 3 | Application filter info_C | LADN DNN_Y |
| 4 | Application ID_D | LADN DNN_Z |

The LADN policy of Table 7 may not include the information related to the LADN service area unlike the LADN information of Table 6. The PCF may provide the LADN policy only to the UE which is present in the LADN service area. An operation in which the PCF drops the LADN policy may be performed based on a network based operation as follows or performed based on a UE based operation.

<Network Based Operation>

In order for the PCF to provide the LADN policy based on the network based operation, the PCF should know whether the UE enters the LADN service area without a help of the UE.

As an example, when the AMF transmits the LADN information to the UE during a registration procedure of the UE, the AMF may notify, to the PCF, that the LADN information is transmitted to the UE. Then, the PCF may transmit the LADN policy to the UE.

In this case, the AMF may transmit, to the PCF, information related to the location of the UE in addition to the SMF. Then, the PCF may determine for which LADN DNN the LADN policy is to be transmitted based on the information related to the location of the UE. Alternatively, the AMF may transmit, to the PCF, the information related to the LADN DNN transmitted to the UE in addition to the SMF. Then, the PCF may determine for which LADN DNN the LADN policy is to be transmitted based on the information related to the LADN DNN.

A method in which the AMF provides the information to the PCF may be implemented by using a service based architecture. That is, the PCF may configure the service related to the LADN in the AMF during a policy association establishment procedure between the AMF and the PCF. For example, the PCF may configure an event for LADN location reporting in the AMF. Specifically, the PCF may configure the LADN service area as the area of interest and configure an event for reporting a case where the UE enters the LADN service area or moves out of the LADN service area in the AMF. Alternatively, the PCF may configure an event for notifying a case where the LADN information is transmitted from the AMF to the UE.

As an another example, when the UE enters the LADN service area, the UE may directly transmit, to the PCF, information indicating that the UE is in the LADN service area. In this case, the AMF, that receives the corresponding information from the UE and transfers the information to the PCF, may transmit information related to in which LADN service area the UE enters, to the PCF together.

<UE Based Operation>

When a preconfigured condition related to the LADN policy is satisfied, the UE may transmit, to the PCF, a message for requesting the LADN policy to the PCF via the AMF. Here, for example, the preconfigured condition may be satisfied when the UE receives the LADN information from the AMF or the UE enters the LADN service area. In this case, the UE may request the LADN policy for specific LADN DNN. Alternatively, the UE may transmit information associated with a version or ID for the previously received LADN policy to help the PCF selectively update the LADN policy. The UE may transmit, to the PCF, the message for requesting the LADN policy, and include information (to distinguish from the request for the URSP) that the LADN policy is requested in the corresponding message and transmit the corresponding message including the information.

When the UE does not request the LADN policy for the specific LADN DNN, the UE may include positional information of the UE in the message for requesting the LADN policy and transmit the message for requesting the LADN policy to the PCF via the AMF. Then, the PCF may determine for which LADN DNN the LADN policy is to be transmitted based on the positional information of the UE.

When the PCF receives the message for requesting the LADN policy from the UE, the PCF may determine whether to transmit the LADN policy based on at least one information of the information related to the subscriber information of the UE, the information related to the LADN DNN, and the positional information of the UE. When determining to transmit the LADN policy, the PCF may transmit, to the UE, the LADN policy in a method which is the same as a method for transmitting the URSP.

Figure 9:
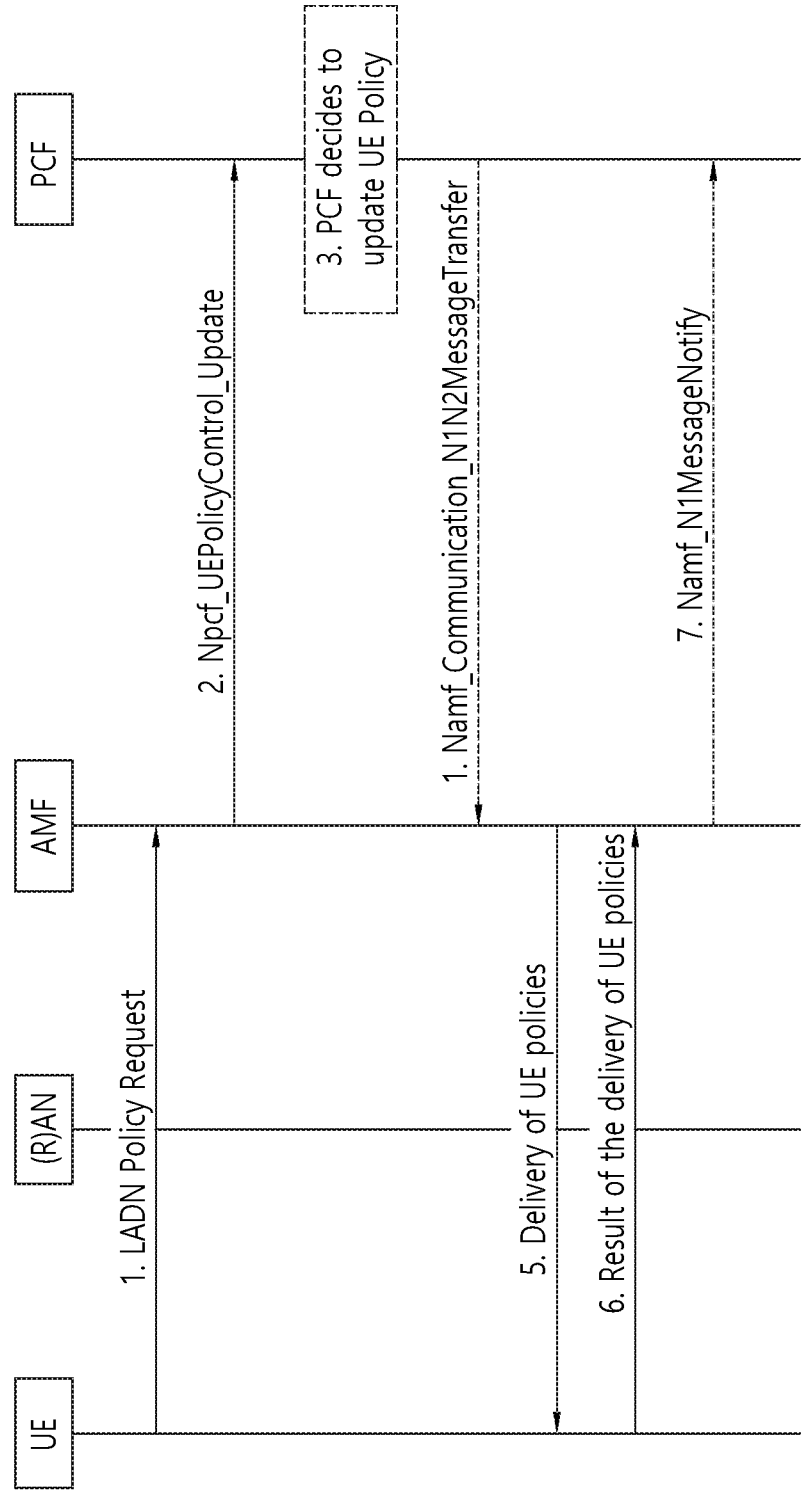
FIG. 9 is an exemplary signal flowchart showing a method for providing an LADN policy.

FIG. 9 is an exemplary signal flowchart showing a method for providing an LADN policy.

Specifically, an LADN policy generation (or update) procedure initiated by the UE will be described with reference to FIG. 9.

1) The UE transmits the message for requesting the LADN policy. When a preconfigured condition related to the LADN policy is satisfied, the UE may transmit the message for requesting the LADN policy. The message for requesting the LADN policy may include information for notifying that the UE requests the LADN policy. The message for requesting the LADN policy may include information related to the LADN DNN held by the UE. Here, the information related to the LADN DNN held by the UE may be a list of LADN DNNs received from the AMF. Further, the message for requesting the LADN policy may include information related to a registration area of the UE or the positional information of the UE. In addition, the message for requesting the LADN policy may include OS information of the UE. When the UE has previously requested the LADN policy in the same registration area, the UE may include a policy section identifier (PSI) related to the LADN policy previously received from the PCF in the message for requesting the LADN policy and transmit the message. Then, the PCF may know the LADN policy previously transmitted based on the PSI and update the LADN policy.

2) When the AMF receives the message for requesting the LADN policy, the AMF transmits, to the PCF, the message for requesting the LADN policy. In this case, the AMF may transmit, to the PCF, the information (e.g., the list of LADN DNNs) related to the LADN DNN transmitted to the UE, the information related to the registration area of the UE, or the positional information of the UE together.

3) The PCF may generate the LADN policy for the UE based on at least one of the information provided from the UE and the information provided from the AMF. When the PSI transmitted from the UE is included in the received message for requesting the LADN policy, the PCF may update the LADN policy. Here, the information provided from the UE may include the information related to the LADN DNN held by the UE, the information related to the registration area of the UE, the positional information of the UE, the OS information of the UE, the subscription information, or the PSI. Here, the information provided from the AMF may be the information related to the LADN DNN, the information related to the registration area of the UE, or the positional information of the UE. The generated LADN policy may include the information related to the application and the information related to the LADN DNN related to the application as in example of Table 7. For example, the generated LADN policy may indicate which LADN DNN should be used for each application. Here, the PCF may transmit the information related to the application in the form of the application ID or the form of the packet filter based on at least one of the OS information and the subscription information. The LADN policy may further include information such as S-NSSAI, SSC mode, or a PDU session type required when the UE uses the specific LADN DNN.

4) The PCF may transmit the LADN policy to the AMF. For example, the PCF may apply the Namf_Communication_N1N2MessageTransfer service operation provided by the AMF. A Namf_Communication_N1N2MessageTransfer message transmitted to the AMF by the PCF may include a SUbscription Permanent Identifier (SUPI) and a UE policy container. The LADN policy may be included in a UE policy container. Here, the PCF may also transmit the PSI together with the LADN policy.

When the PCF provides the PSI to the UE, and as a result, the UE then determines that the LADN policy needs to be updated (for example, when establishing the PDU session based on the LADN policy held by the UE is unsuccessful), the UE may request the LADN policy again based on the PSI in the same registration area.

The UE that receives the LADN policy may determine the LADN DNN to be used based on the LADN policy. Specifically, the UE may determine the LADN DNN related to the application to be used by the UE. In addition, the UE may perform a PDU session establishment procedure related to the LADN DNN. Specifically, the UE may perform a PDU session establishment request procedure related to the LADN DNN.

Steps 5 to 7 of FIG. 9 may be performed in the same method as steps 3 to 5 of FIG. 8.

III. Third Proposal—Method for Updating URSP IN VPLMN

The PCF of the VPLMN updates the URSP to help the UE to establish the PDU session related to the LADN DNN. Since the VPLMN has the information related to the LADN for the UE which is roaming, the VPLMN may provide the information related to the corresponding LADN.

As an example, V-PCF of the HPLMN may receive the URSP from H-PCF of the HPLMN and update the received URSP based on the information related to the LADN. In addition, the V-PCF may transmit the updated URSP to the H-PCF.

As another example, the V-PCF of the VPLMN may generate the rule for the LADN based on the information related to the LADN, and include the rule for the LADN in the URSP and transmit the URSP to the UE. The UE may apply the URSP rule received from the V-PCF only to the LADN DNN matching the information related to the LADN DNN included in the LADN information (LADN information of the first proposal or the second proposal) received from the AMF. In addition, the URSP rule received from the V-PCF may not be applied to unmatched LADN DNN.

In order to apply the URSP rule received from the V-PCF only to the LADN DNN matching the information related to the LADN DNN, the UE needs to know from which PLMN the URSP is received.

For example, when the V-PCF and the H-PCF include the PLMN ID in the PSI, which is transmitted to the UE, and transmits the PSI, the UE may know from which PLMN the URSP is received based on the PSI. Alternatively, the V-PCF and the H-PCF may transmit PLMN ID information to the UE separately from the PSI.

For another example, when the AMF transmits the URSP to the UE, the AMF may transmit the URSP including the PLMN ID of the PCF in order to notify whether the corresponding URSP is transmitted from the H-PCF or the V-PCF. In this case, the UE should transmit the PSI including all PSIs for respective PLMNs while providing the PSI in the registration update. In this case, the UE may transmit the PSI including PLMN IDs for the respective PSIs together.

Figure 10:
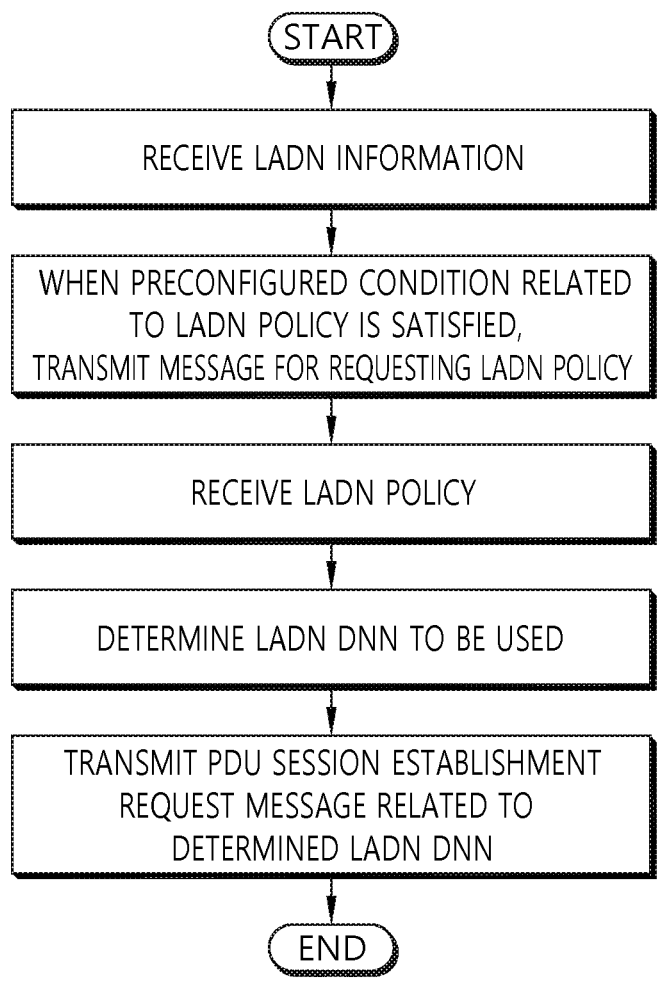
FIG. 10 is a signal flowchart showing an example of an operation of a UE according to a disclosure of this specification.

FIG. 10 is a signal flowchart showing an example of an operation of a UE according to the disclosure of this specification.

The steps illustrated in FIG. 10 may be performed in a different order from the drawings, and performed while some steps are omitted. The UE may perform all operations described in the disclosure (including the first to third proposals) of this specification in addition to the steps illustrated in FIG. 10.

The UE may receive the LADN information. Specifically, the UE may receive the LADN information from the AMF, and the AMF may transmit the LADN information to the UE when the AMF has the LADN information. Here, the LADN information means information associated with the LADN. The LADN information includes information related to the LADN DNN and information related to the LADN service area associated with the LADN DNN. The LADN information may include information related to the application, information related to the LADN DNN associated with the application, and information related to the LADN service area associated with the LADN DNN. The UE may receive, from the AMF, information that LADN information is applied preferentially over the URSP or information that the URSP is applied preferentially over the LADN information. For reference, the UE may receive the updated URSP from the VPLMN as described in the third proposal without performing the step of receiving the LADN information.

When a preconfigured condition related to the LADN policy is satisfied, the UE may transmit the message for requesting the LADN policy. The PCF may transmit a message for requesting the LADN policy to the AMF. Then, the AMF may transmit the message for requesting the LADN policy to the PCF. Here, the preconfigured condition may be satisfied when the information associated with the LADN is received from the AMF or the UE enters the LADN service area. The message for requesting the LADN policy may include information associated with the LADN DNN of interest or information related to the location of the UE. Meanwhile, the message for requesting the LADN policy may include information related to the LADN policy previously received from the AMF. When the LADN policy request message includes the information related to the LADN policy previously received from the AMF and is transmitted to the AMF, the UE may receive the LADN policy updated by the PCF from the AMF.

The UE may receive the LADN policy. Specifically, the UE may receive the LADN policy from the AMF, and the AMF receives the LADN policy from the PCF. Here, the LADN policy may include information related to at least one application and information related to the LADN DNN related to at least one application. Here, the information related to the LADN DNN may include information related to at least one of S-NSSAI, SSC mode, and PDU session type. The information related to at least one application may be an application ID or packet filter information.

The UE may determine the LADN DNN to be used based on the LADN policy. Specifically, the UE may determine the LADN DNN related to the application to be used.

Then, the UE may transmit a PDU session establishment request message related to the determined LADN DNN.

Figure 11:
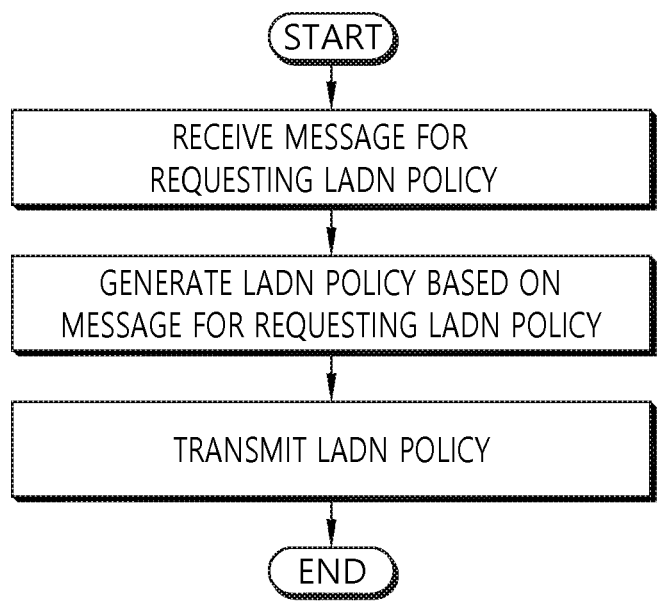
FIG. 11 is a signal flowchart showing an example of an operation of a PCF according to a disclosure of this specification.

FIG. 11 is a signal flowchart showing an example of an operation of a PCF according to the disclosure of this specification.

The steps illustrated in FIG. 11 may be performed in a different order from the drawings, and performed while some steps are omitted. The PCF may perform all operations described in the disclosure (including the first to third proposals) of this specification in addition to the steps illustrated in FIG. 10. For reference, the PCF of FIG. 11 may be the PCF of the VPLMN.

The PCF may receive the message for requesting the LADN policy. Specifically, the PCF may receive the message for requesting the LADN policy from the AMF, and the message may be a message transmitted to the AMF by the UE. Here, the UE may transmit the message for requesting the LADN policy to the AMF when the preconfigured condition described in FIG. 10 and the disclosure of this specification is satisfied. The message for requesting the LADN policy may include information associated with the LADN DNN of interest or information related to the location of the UE. In addition, the message for requesting the LADN policy may include at least one of a LADN DNN list, a registration area of the UE, positional information of the UE, OS information of the UE, and PSI information. The PCF may transmit, to the AMF, a message for configuring an event related to the LADN. In addition, when the PCF receives a message indicating that the LADN-related event occurs from the AMF, the PCF may transmit the LADN policy to the AMF. Here, the LADN-related event may include an event in which the UE enters the LADN service area.

The PCF may generate the LADN policy based on the message for requesting the LADN policy. Here, the LADN policy may include information related to at least one application and information related to the LADN DNN related to at least one application. Here, the information related to at least one application may be an application ID or packet filter type information. When the message for requesting the LADN policy includes information related to the LADN policy previously received by the UE, the PCF may generate the updated LADN policy (i.e., may update the previously received LADN policy).

The PCF may transmit the LADN policy. Specifically, the PCF may transmit the LADN policy to the AMF and the AMF may transmit the LADN policy to the UE. The LADN policy may be used for determining the LADN DNN to be used by the UE. When the PCF generates the updated LADN policy, the PCF may transmit the updated LADN information to the AMF.

Figure 12:
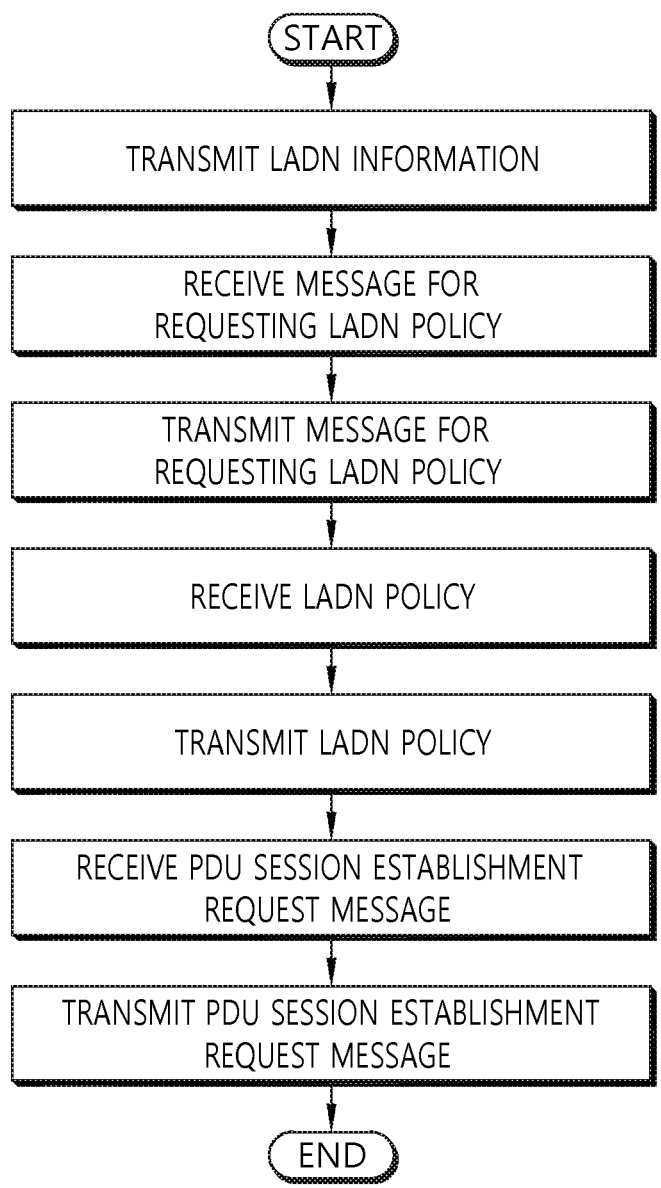
FIG. 12 is a signal flowchart showing an example of an operation of an AMF according to a disclosure of this specification.

FIG. 12 is a signal flowchart showing an example of an operation of an AMF according to the disclosure of this specification.

The steps illustrated in FIG. 12 may be performed in a different order from the drawings, and performed while some steps are omitted. The AMF may perform all operations described in the disclosure (including the first to third proposals) of this specification in addition to the steps illustrated in FIG. 10. For reference, the AMF of FIG. 12 may be the AMF of the VPLMN.

The AMF may transmit the LADN information. Specifically, the AMF may transmit the LADN information to the UE. The LADN information includes information related to the LADN DNN and information related to the LADN service area associated with the LADN DNN. The LADN information may include information related to the application, information related to the LADN DNN associated with the application, and information related to the LADN service area associated with the LADN DNN. Further, the AMF may receive, from the UE, information that LADN information is applied preferentially over the URSP or information that the URSP is applied preferentially over the LADN information.

The AMF may receive the message for requesting the LADN policy. Specifically, the AMF may receive, from the UE, the message for requesting the LADN policy. The message requesting the LADN policy may include information associated with the LADN DNN of interest or information related to the location of the UE. Meanwhile, the message for requesting the LADN policy may include information related to the LADN policy previously received from the AMF.

The AMF may transmit the message for requesting the LADN policy. Specifically, the AMF may transmit, to the PCF, the message for requesting the LADN policy received from the UE. Alternatively, the AMF may transmit, to the UE, the information related to the LADN and transmit, to the PCF, information for notifying that the information related to the LADN is provided to the UE. Alternatively, the AMF may receive, from the PCF, a message for configuring an event related to the LADN (e.g., an event in which the UE enters the LADN service area) related to the LADN. When the event related to the LADN occurs, the AMF may transmit, to the PCF, a message that the event related to the LADN occurs.

The AMF may receive the LADN policy. Specifically, the AMF may receive, from the PCF, the LADN policy. The AMF may receive the LADN policy from the PCF when providing, to the PCF, information for notifying that the information related to the LADN is provided. Alternatively, when the AMF transmits a message indicating that the LADN-related event occurs to the PCF, the AMF may receive the LADN policy from the PCF.

The AMF may transmit the LADN policy. Specifically, the AMF may transmit, to the UE, the LADN policy received from the PCF. The LADN policy may include information related to at least one application and information related to the LADN DNN related to at least one application. Here, the information related to the LADN DNN may include information related to at least one of S-NSSAI, SSC mode, and PDU session type. The information related to at least one application may be an application ID or packet filter information.

The AMF may receive a PDU session establishment request message. Specifically, the AMF may receive the PDU session establishment request message from the UE.

The AMF may transmit the PDU session establishment request message. Specifically, the AMF may transmit, to the SMF, the PDU session establishment request message received from the UE.

Figure 13:
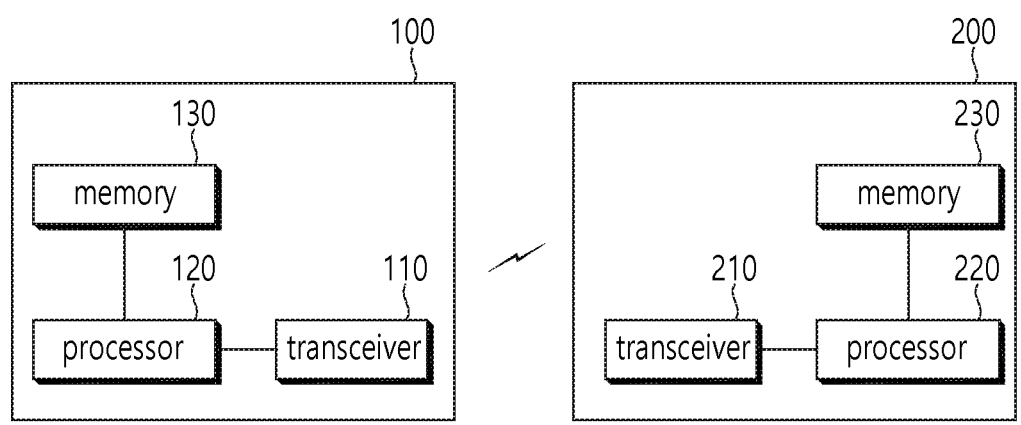
FIG. 13 is a block diagram illustrating a UE or a network node in which a disclosure of this specification is implemented.

FIG. 13 is a block diagram showing a wireless device and a network node in which a disclosure of this specification is implemented.

Referring to FIG. 13, a wireless device (100) and a network node (200) may implement the disclosure of this specification. The wireless device (100) may be the UE that is described in the disclosure of this specification. And, the network node (200) may be SMF 1, SMF 2, AMF, first UPF, and second UPF that are described in the disclosure of this specification.

As shown in the drawing, the wireless device (100) includes a processor (120), a memory (130), and a transceiver (110). Similarly, as shown in the drawing, the base station (200) includes a processor (220), a memory (230), and a transceiver (210). The processors (120, 220), the memories (130, 230), and the transceivers (110, 210) may each be implemented as a separate chip or at least two or more blocks/functions may be implemented by a single chip.

The transceiver (110, 210) includes a transmitter and a receiver. In case a specific operation is being performed, any one of the transmitter and the receiver may be operated, or both the transmitter and the receiver may be operated. The transceiver (110, 210) may include one or more antennas transmitting and/or receiving radio signals. Additionally, the transceiver (110, 210) may include an amplifier that is used for amplifying a reception signal and/or a transmission signal, and a band-pass filter that is used for performing transmission to a specific frequency band.

The processor (120, 220) may implement the functions, processes, and/or methods that are proposed in this specification. The processor (120, 220) may include an encoder and a decoder. For example, the processor (120, 220) may perform the operations according to the description presented above. The above-described processor (120, 220) may include an application-specific integrated circuit (ASIC), another chip set, a logical circuit, a data processing device, and/or a converter converting a baseband signal and a radio signal to and from one another.

The memory (130, 230) may include a read-only memory (ROM), a random access memory (RAM), a flash memory, a memory card, a storage medium, and/or another storage device.

Figure 14:
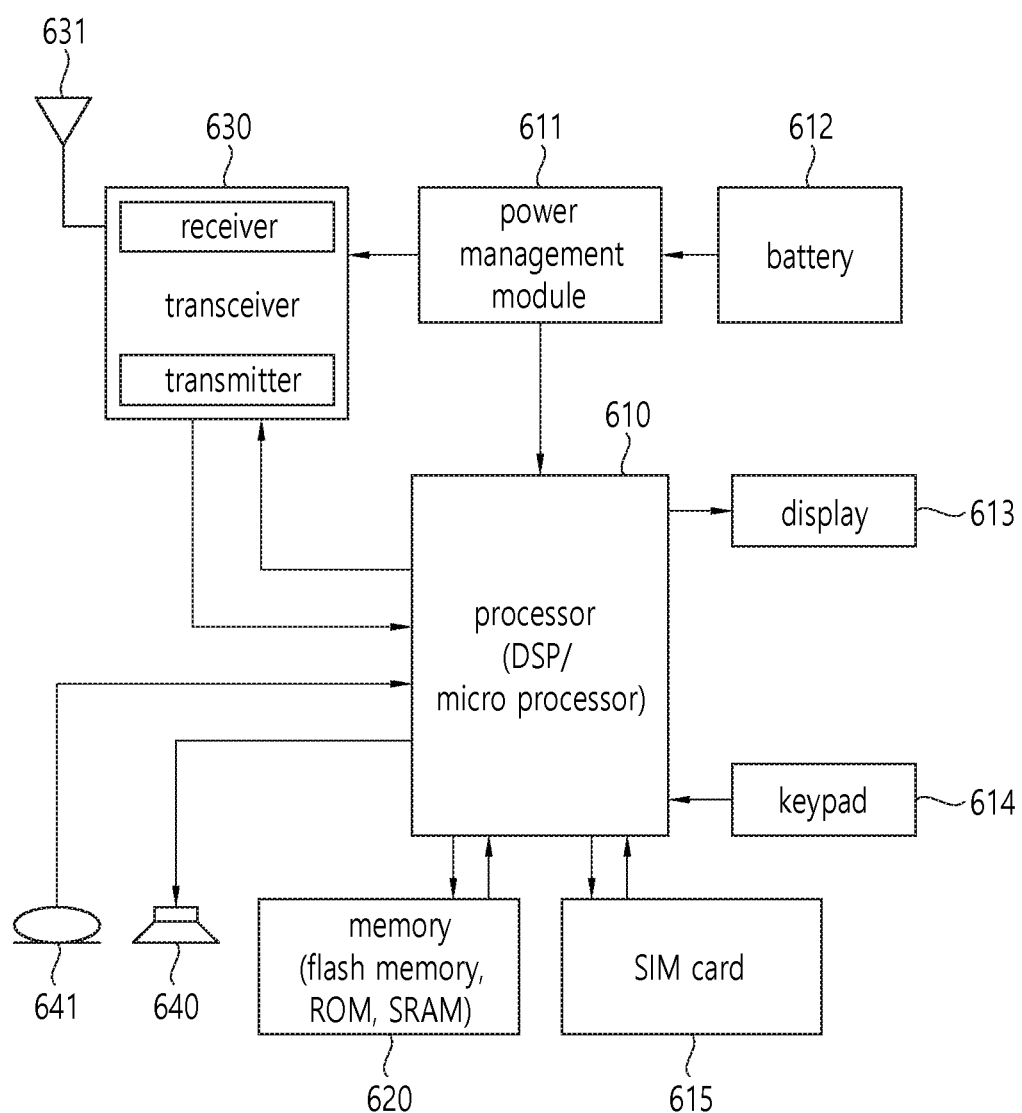
FIG. 14 is a detailed block diagram illustrating a UE or a network node in which a disclosure of this specification is implemented.

FIG. 14 is a detailed block diagram illustrating a UE or a network node in which a disclosure of this specification is implemented.

A device illustrated in FIG. 14 means the UE 100 or the network node 200 of FIG. 13. The device includes a processor 610, a memory 620, and a transceiver 630.

Specifically, the processor 610 may be the processor 120 of the UE 100 or the processor 220 of the network node 200. The memory 620 may be the memory 130 of the UE 100 or the memory 230 of the network node 200. The transceiver 630 may be the transceiver 110 of the UE 100 or the transceiver 210 of the network node 200.

The processor 610 may be configured to implement a proposed function, procedure, and/or method described in this specification. Layers of a radio interface protocol may be implemented by the processor 610.

More specifically, if the processor 610 is the processor 120 of the UE 100, when a preconfigured condition related to the LADN policy is satisfied, the processor 610 may be configured to transmit a message requesting the LADN policy to the AMF and receive the LADN policy provided by the PCF from the AMF, in which the LADN policy includes information related to at least one application and information related to an LADN DNN related to the at least one application; determine a LADN DNN to be used based on the LADN policy; and transmit a PDU session establishment request message related to the determined LADN DNN to the AMF.

If the processor 610 is the processor 220 of the network node 200, the processor 610 may be configured to receive a message for requesting the LADN policy from the AMF, in which the message for requesting the LADN policy is a message transmitted to the AMF by the UE; generate the LADN policy based on the message for requesting the LADN policy, in which the LADN policy includes the information related to at least one application and the information related to the LADN DNN related to the at least one application; and transmit the LADN policy to the AMF.

The memory 620 is connected with the processor 610 to be operable and stores various pieces of information for driving the processor 610. The transceiver 630 is connected with the processor 610 to be operable and transmits and/or receives a radio signal.

The processors 610 and 2021 may include an application-specific integrated circuit (ASIC), another chipset, a logic circuit, and/or a data processing apparatus. The memory 620 may include a read-only memory (ROM), a random access memory (RAM), a flash memory, a memory card, a storage medium, and/or other storage devices. The transceiver 630 may include a baseband circuit for processing a radio frequency signal. When an embodiment is implemented as software, techniques described in this specification may be implemented as modules (e.g., procedure, function, etc.) performing the functions described in this specification. The module may be stored in the memory 620 and executed by the processor 610. The memory 620 may be implemented inside the processor 610. Alternatively, the memory 620 may be implemented outside the processor 610 and connected to the processor 610 to be communicable through various means known in a technical field.

According to an embodiment of the present disclosure, which is illustrated in FIG. 14, the UE which is roaming may also receive the service using the LADN. Specifically, the UE which is roaming may establish the PDU session by using the LADN.

Figure 15:
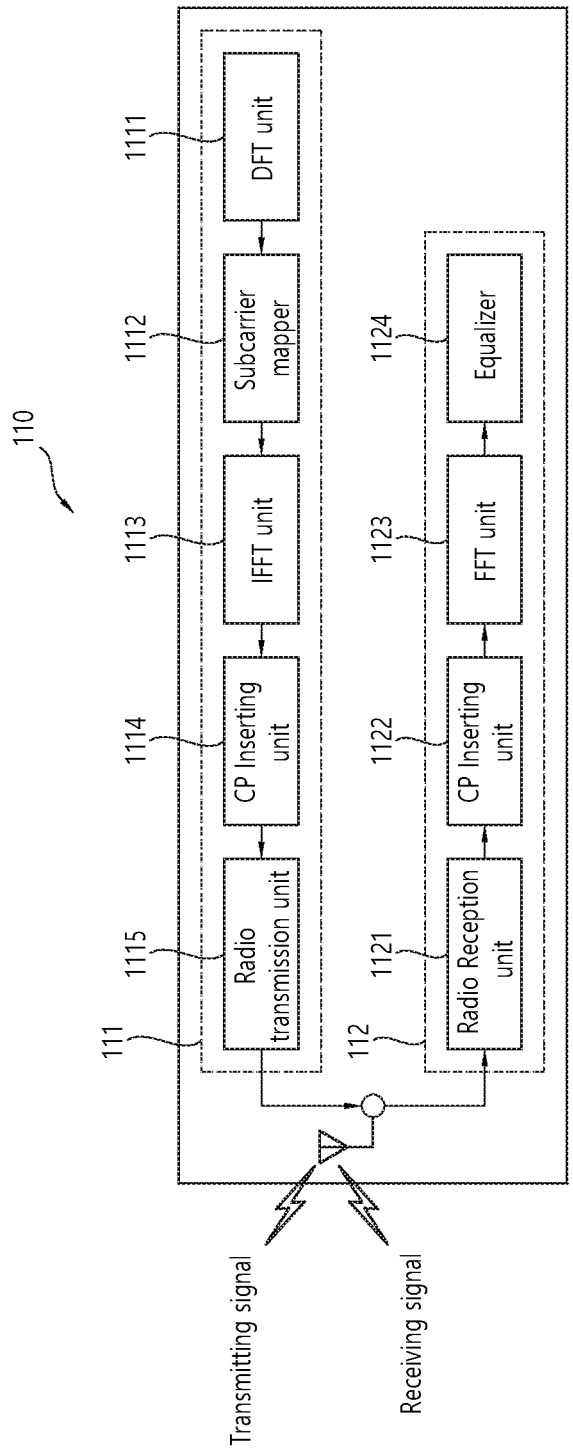
FIG. 15 is a detailed block diagram of transceivers of the UE and the network node illustrated in FIG. 13.

FIG. 15 is a detailed block diagram of the transceiver of the UE or the network node illustrated in FIG. 13.

In FIG. 15, the transceiver 110 means the transceiver 110 of FIG. 13 in the UE and transceiver 210 of FIG. 13 in the network node. Referring to FIG. 15, the transceiver 110 includes a transmitter 111 and a receiver 112. The method proposed by the present disclosure can be used in various schemes as well as in ICIC. For example, the method can be used to identify the difference between DL timings of multiple serving cells, and to maintain synchronization of each serving cell. The transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, and so on). The module is stored in the memory and may be executed by the processor. The memory may exist inside or outside the processor and may be connected to the processor in various known means.

In the above exemplary systems, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A method for performing a Protocol Data Unit (PDU) session establishment procedure for a Local Area Data Network (LADN) by a user equipment (UE), the method comprising:

transmitting a registration request message to an Access and Mobility Management Function (AMF);

receiving a registration accept message from the AMF;

when a preconfigured condition related to an LADN policy is satisfied, transmitting a message for requesting an LADN policy to a Policy Control Function (PCF), via the AMF, wherein the message for requesting the LADN policy includes information related to the LADN policy previously received from the PCF;

receiving, from the PCF via the AMF, the LADN policy updated by the PCF, wherein the LADN policy includes information related to at least one application and information related to a LADN Data Network Name (DNN) related to the at least one application;
determining a LADN DNN to be used by the UE based on the LADN policy; and
transmitting, to the AMF, a PDU session establishment request message related to the determined LADN DNN.

2. The method of claim 1, wherein the message for requesting the LADN policy includes at least one of information indicating that the LADN policy is requested, information associated with the LADN DNN, information related to a registration area of the UE, and information related to a location of the UE.

3. The method of claim 1, wherein the information related to the LADN DNN included in the LADN policy includes information related to at least one of Single Network Slice Selection Assistance Information (S-NSSAI) associated with the LADN DNN, a Session and Service Continuity (SSC) mode, and a PDU session type.

4. The method of claim 1, wherein the preconfigured condition is satisfied when the information associated with the LADN is received from the AMF or the UE enters an LADN service area.

5. The method of claim 1, wherein the information related to the at least one application is an application ID or packet filter type information.

6. A method for performing a Protocol Data Unit (PDU) session establishment procedure for LADN by a Policy Control Function (PCF), the method comprising:
receiving, from an Access and Mobility Management Function (AMF), a message for requesting a Local Area Data Network policy (LADN policy),
wherein the message for requesting the LADN policy is a message transmitted to the AMF by a user equipment (UE);
generating the LADN policy based on the message for requesting the LADN policy,
wherein the LADN policy includes information related to at least one application and information related to a LADN DNN related to the at least one application; and
transmitting, to the AMF, the LADN policy.

7. The method of claim 6, wherein the LADN policy is delivered from the AMF to the UE and used for determining the LADN DNN to be used by the UE.

8. The method of claim 6, further comprising:
receiving, from the AMF, information for notifying that information related to the LADN is provided to the UE; and
when the AMF receives the information for notifying that the information related to the LADN is provided, transmitting the LADN policy to the AMF.

9. The method of claim 6, further comprising:
transmitting, to the AMF, a message for configuring an event related to the LADN; and
when the message for configuring the event related to the LADN is received from the AMF, transmitting the LADN policy to the AMF,
wherein the event related to the LADN includes an event in which the UE enters an LADN service area.

10. The method of claim 6, wherein the message for requesting the LADN policy includes at least one of information indicating that the LADN policy is requested, information associated with the LADN DNN, information related to a registration area of the UE, information related to a location of the UE, operating system (OS) information of the UE, and PSI information.

11. The method of claim 6, further comprising:
when the message for requesting the LADN policy includes information related to the LADN policy previously received by the UE, generating an updated LADN policy; and
transmitting the updated LADN policy to the AMF.

12. The method of claim 6, wherein the information related to the at least one application is an application ID or packet filter type information.

13. A processor of a wireless device, wherein the processor controls the wireless device, and
wherein the processor is configured to:
transmit a registration request message to an Access and Mobility Management Function (AMF);
receive a registration accept message from the AMF;
when a preconfigured condition related to a Local Area Data Network (LADN) policy is satisfied, transmit a message for requesting an LADN policy to a Policy Control Function (PCF), via the AMF,
wherein the message for requesting the LADN policy includes information related to the LADN policy previously received from the PCF;
receive, from the PCF via the AMF, the LADN policy updated by the PCF,
wherein the LADN policy includes information related to at least one application and information related to a LADN DNN related to the at least one application;
determine a LADN DNN to be used based on the LADN policy; and
transmit, to the AMF, a Protocol Data Unit (PDU) session establishment request message related to the determined LADN DNN.

14. The processor of a wireless device of claim 13, wherein the preconfigured condition is satisfied when the information associated with the LADN is received from the AMF or the wireless device enters an LADN service area.

* * * * *